(12) United States Patent
Mori et al.

(10) Patent No.: US 10,013,050 B2
(45) Date of Patent: Jul. 3, 2018

(54) DISPLAY CONTROL BASED ON USER INFORMATION

(71) Applicant: SONY CORPORATION, Tokyo (JP)

(72) Inventors: Hideto Mori, Tokyo (JP); Yusuke Sakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/573,983

(22) Filed: Dec. 17, 2014

(65) Prior Publication Data

US 2015/0185824 A1 Jul. 2, 2015

(30) Foreign Application Priority Data

Dec. 27, 2013 (JP) .................. 2013-273225

(51) Int. Cl.
| | | |
|---|---|---|
| G09G 5/00 | (2006.01) | |
| G06F 3/01 | (2006.01) | |
| G09G 3/20 | (2006.01) | |
| G06F 3/0485 | (2013.01) | |

(52) U.S. Cl.
CPC .............. *G06F 3/01* (2013.01); *G06F 3/013* (2013.01); *G06F 3/017* (2013.01); *G06F 3/0485* (2013.01); *G09G 3/20* (2013.01); *G09G 2300/026* (2013.01)

(58) Field of Classification Search
CPC .......... G06F 3/01; G06F 3/0485; G06F 3/013; G06F 3/017
USPC .......................................................... 345/156
See application file for complete search history.

(56) References Cited

U.S. PATENT DOCUMENTS

| | | | | |
|---|---|---|---|---|
| 6,014,121 A * | 1/2000 | Aratani | ................. | G06T 3/4015 345/87 |
| 6,331,840 B1 * | 12/2001 | Nielson | ................. | G06F 3/0488 345/1.1 |
| 2001/0012001 A1 * | 8/2001 | Rekimoto | ............... | G06F 3/017 345/173 |
| 2006/0143571 A1 * | 6/2006 | Chan | ................... | G06F 3/03543 715/764 |
| 2010/0064259 A1 * | 3/2010 | Alexanderovitc | .... | G06F 1/1626 715/852 |
| 2011/0254865 A1 * | 10/2011 | Yee | .......................... | G06F 3/013 345/661 |
| 2012/0096393 A1 * | 4/2012 | Shim | ..................... | G06F 3/0485 715/784 |
| 2013/0076661 A1 * | 3/2013 | Reeves | ................. | G06F 3/1438 345/173 |
| 2013/0328767 A1 * | 12/2013 | Itoh | ........................ | G06F 3/017 345/156 |
| 2014/0184526 A1 * | 7/2014 | Cho | ........................ | G06F 3/041 345/173 |

FOREIGN PATENT DOCUMENTS

JP 2009-251303 A 10/2009

* cited by examiner

*Primary Examiner* — Towfiq Elahi
(74) *Attorney, Agent, or Firm* — Chip Law Group

(57) ABSTRACT

There is provided a display control device including a screen control unit configured to generate objects including content, generate a screen in which the objects are consecutively arranged in a transverse direction, and control the screen, and a user information acquiring unit configured to acquire user information including positional information of a user with respect to the screen. The screen control unit controls the screen based on the user information acquired by the user information acquiring unit.

24 Claims, 30 Drawing Sheets

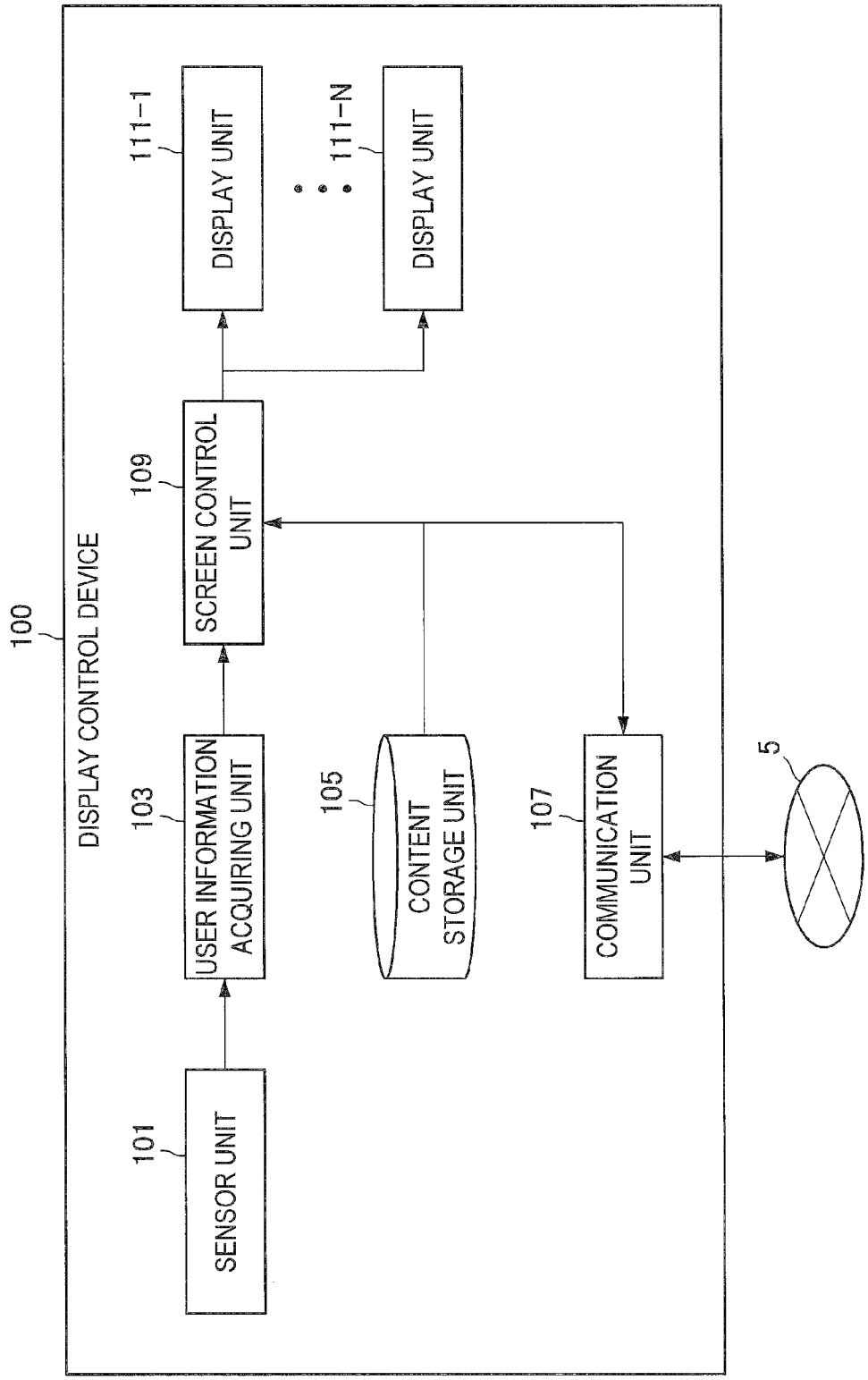

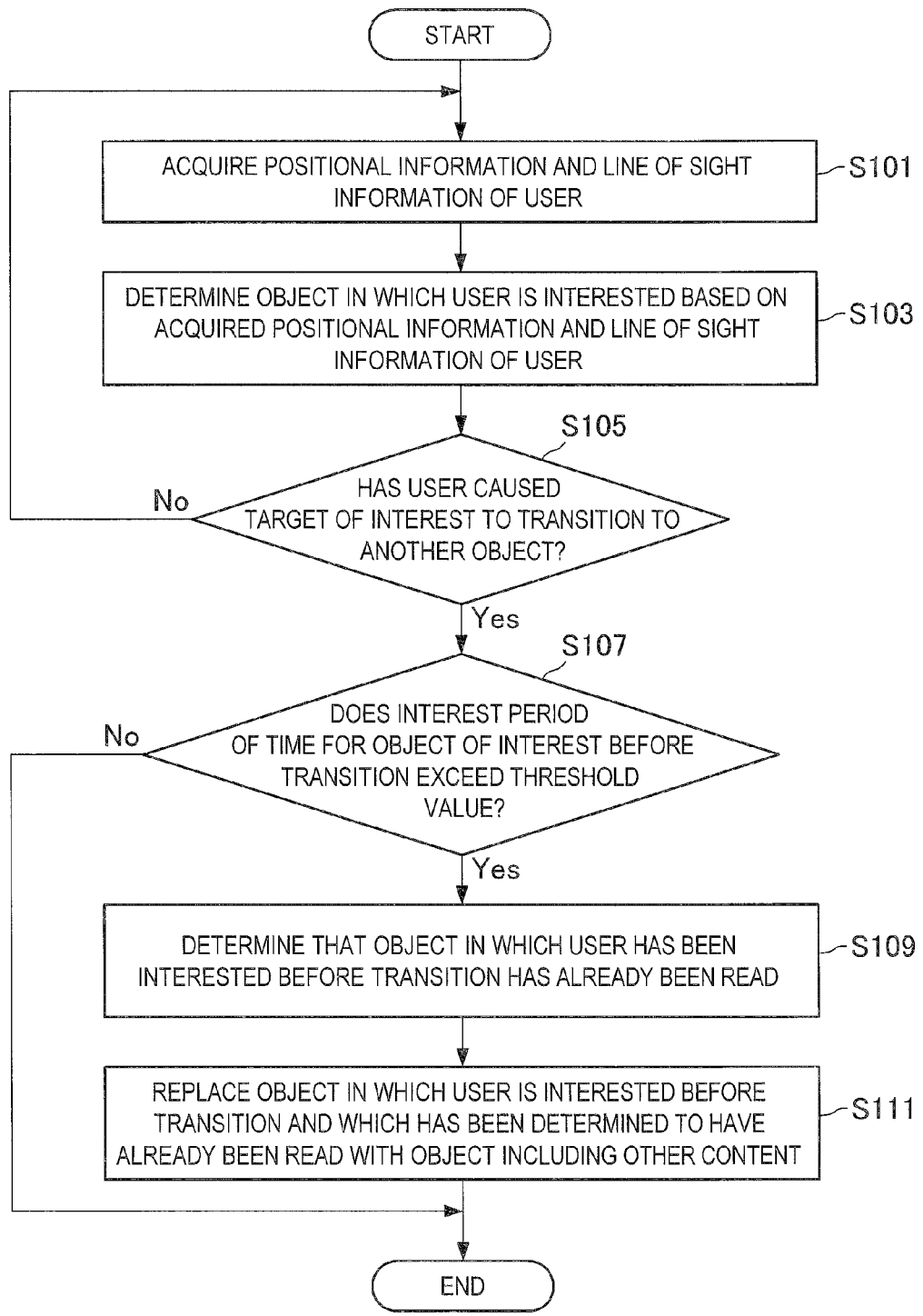

FIG.13
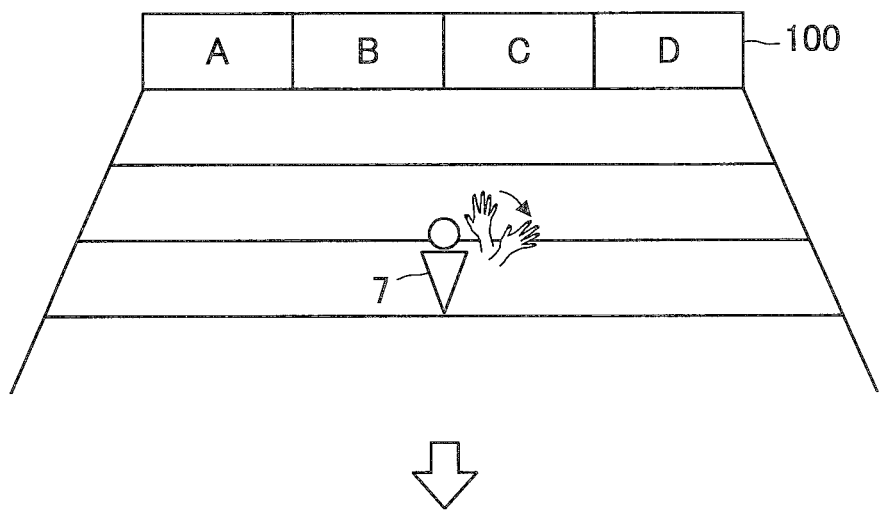
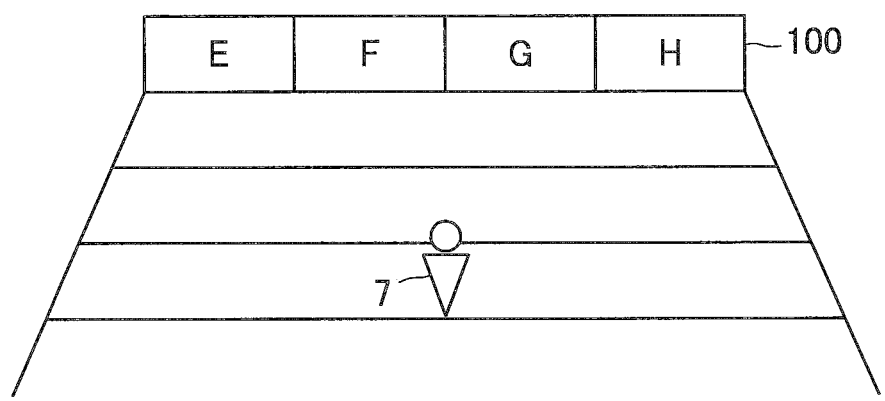

FIG.14
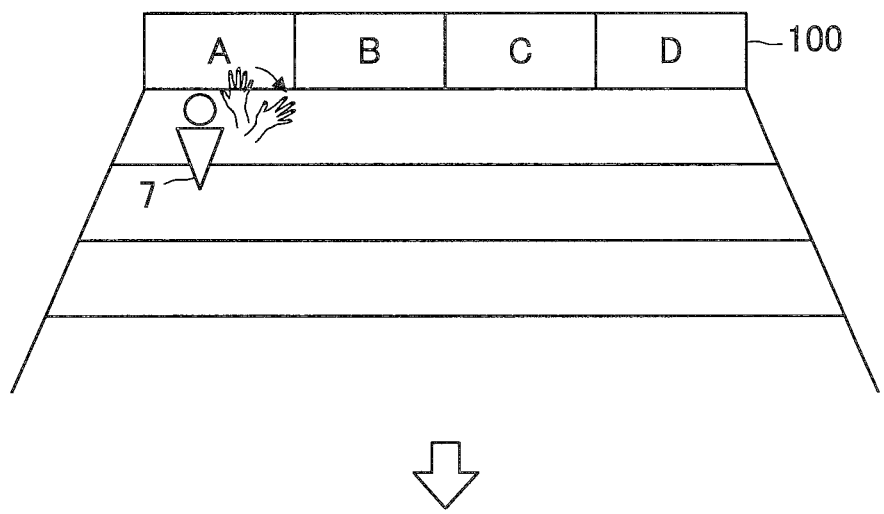
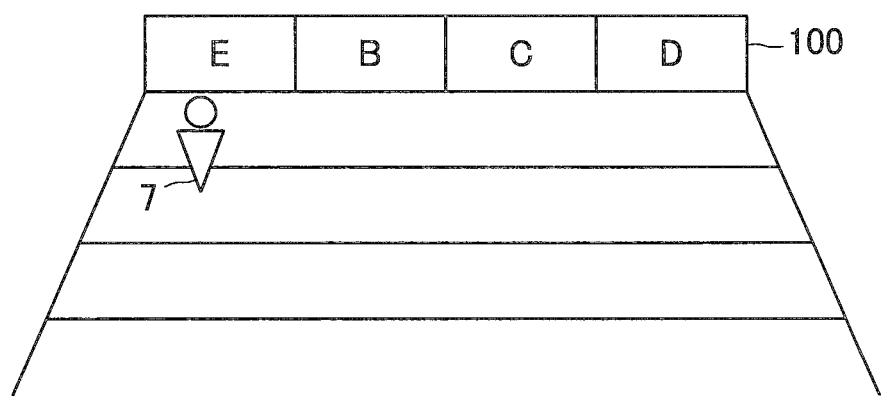

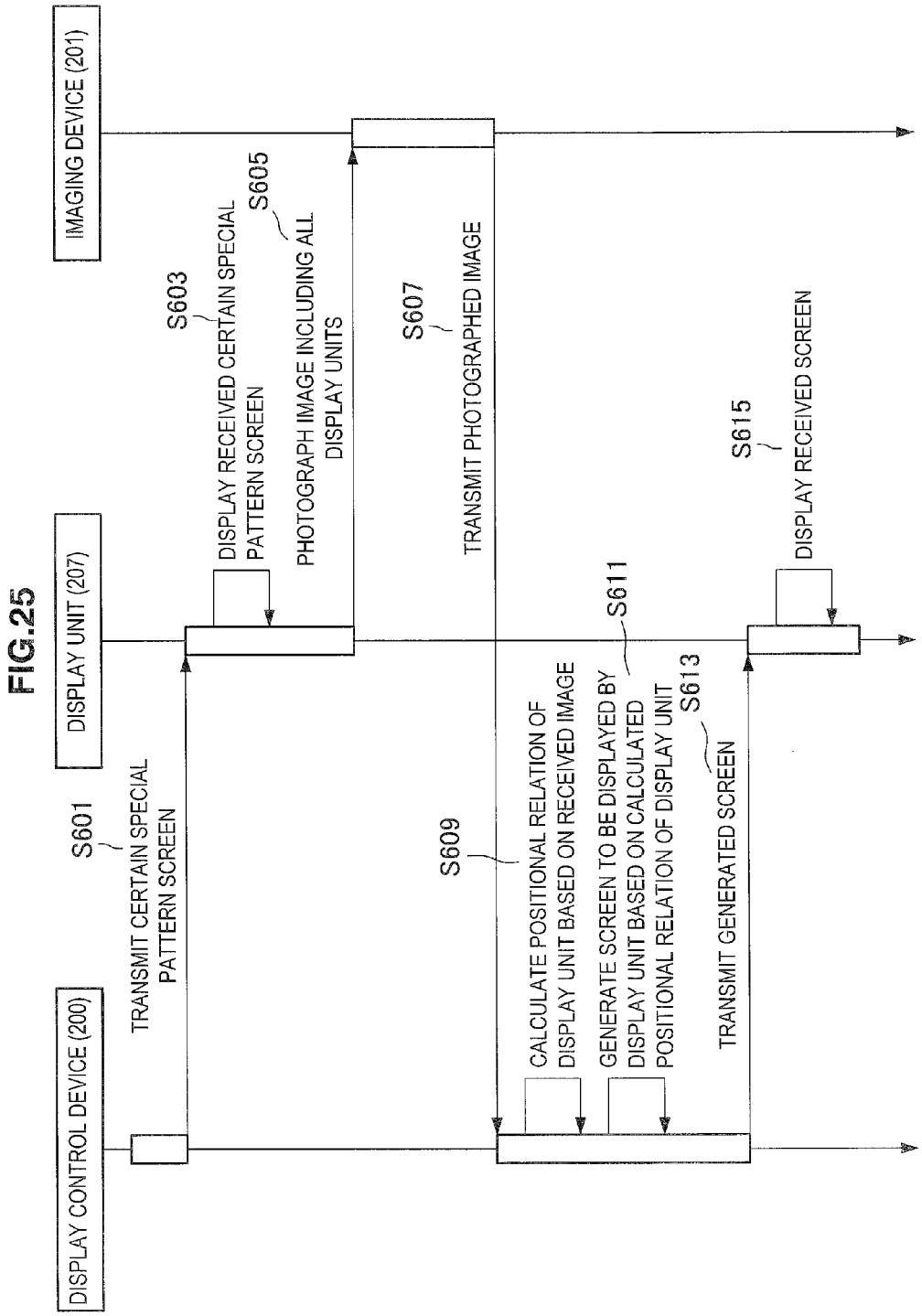

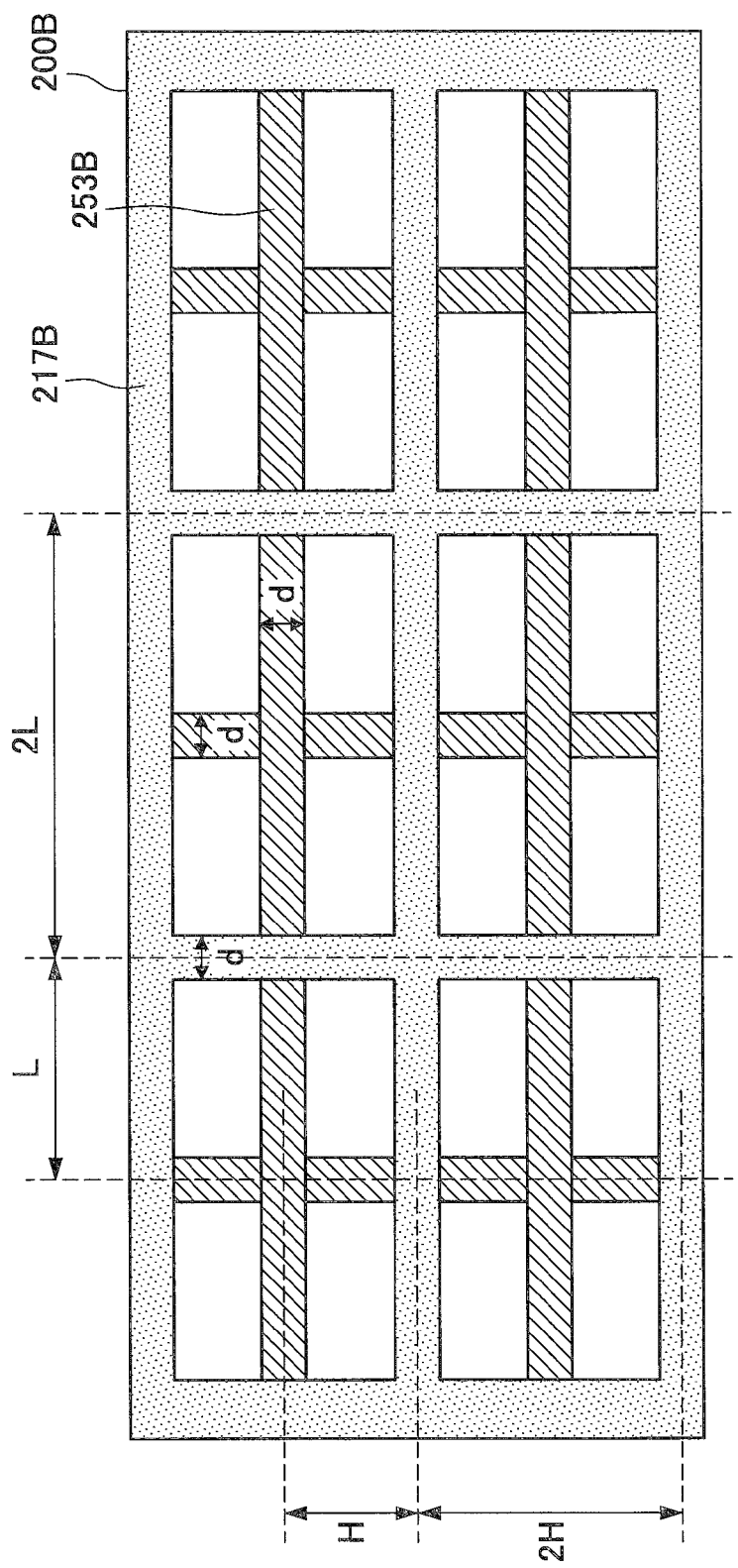

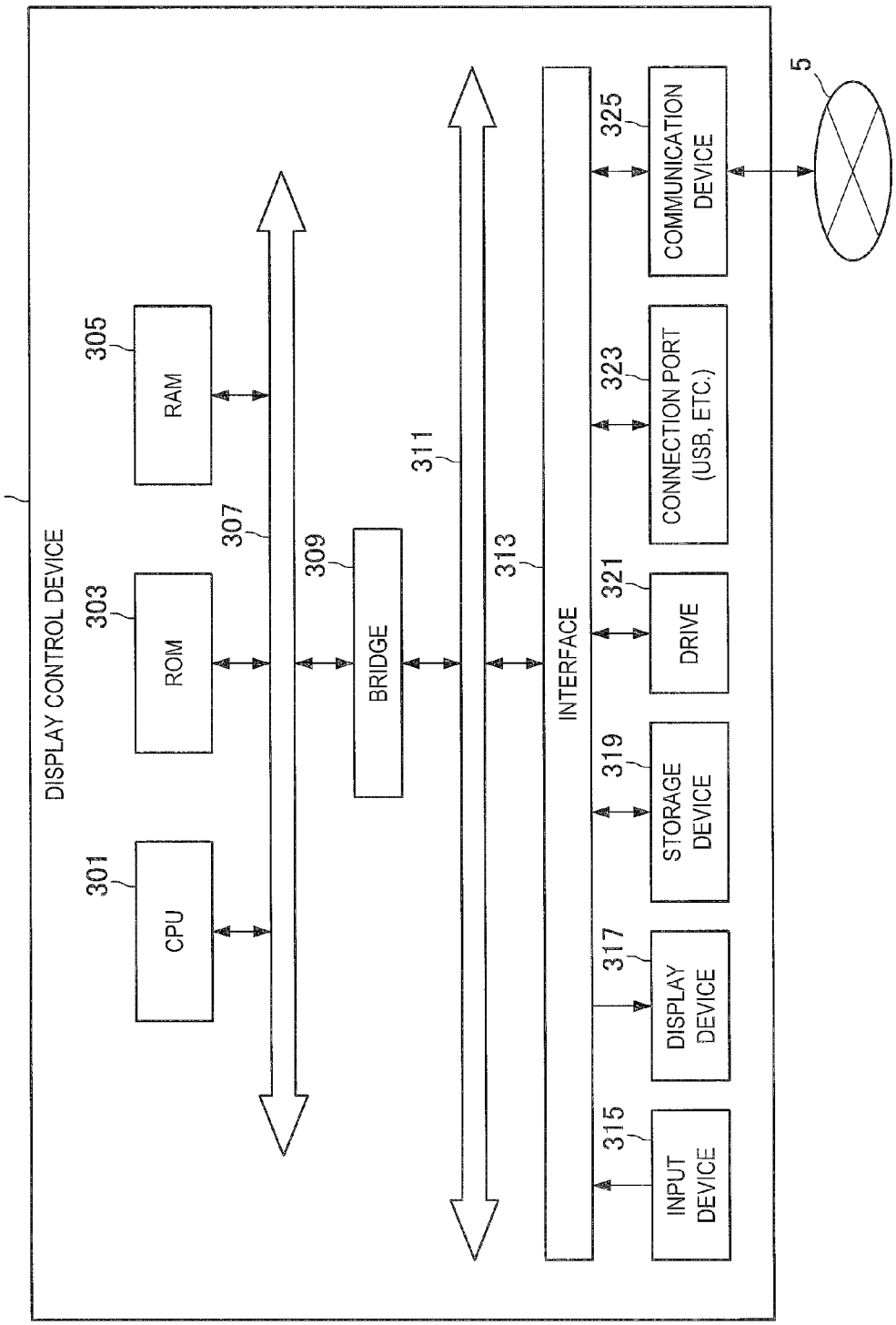

DISPLAY CONTROL BASED ON USER INFORMATION

CROSS REFERENCE TO RELATED APPLICATIONS

This application claims the benefit of Japanese Priority Patent Application JP 2013-273225 filed Dec. 27, 2013, the entire contents of which are incorporated herein by reference.

BACKGROUND

The present disclosure relates to a display control device, a display control system, a display control method, and a program.

In recent years, display devices such as tablet terminals in which an input operation can be performed through a touch panel have become widespread. The display devices with the touch panels can provide an operation method that is easy to understand visually and be equipped with a large screen without an input device such as a keyboard, and thus are expected to become more prevalent in the future. In such display devices, in order to improve operability and visibility for a user, an operation of detecting a state of the user using a sensor and optimizing screen control is performed.

For example, JP 2009-251303A discloses a technique of detecting a line of sight of the user using a sensor and controlling a position of an object to be displayed based on the detected line of sight of the user when a plurality of objects are displayed in a tablet terminal.

SUMMARY

However, when a display device is equipped with a large screen and installed, for example, on a wall, a floor, a table, or the like, a positional relation between the user and the display device is not fixed. For this reason, the display devices are used at various angles and positions according to the user. Thus, in the technique disclosed in JP 2009-251303A of controlling the display position of the object based on the line of sight of the user, when the display device is equipped with the large screen, it is difficult to improve operability and visibility for the user.

It is desirable to provide a display control device, a display control system, a display control method, and a program, which are novel and improved and capable of performing screen generation and control suitable for a large screen.

According to an embodiment of the present disclosure, there is provided a display control device including a screen control unit configured to generate objects including content, generate a screen in which the objects are consecutively arranged in a transverse direction, and control the screen, and a user information acquiring unit configured to acquire user information including positional information of a user with respect to the screen. The screen control unit controls the screen based on the user information acquired by the user information acquiring unit.

According to another embodiment of the present disclosure, there is provided a display control method including, by an arithmetic processing device, generating objects including content and generating a screen in which objects are consecutively arranged in a transverse direction, acquiring user information including positional information of a user with respect to the screen, and controlling the generated screen based on the acquired user information.

According to still another embodiment of the present disclosure, there is provided a program for causing a computer to function as a screen control unit configured to generate objects including content, generate a screen in which the objects are consecutively arranged in a transverse direction, and control the screen, and a user information acquiring unit configured to acquire user information including positional information of a user with respect to the screen. The screen control unit controls the generated screen based on the user information acquired by the user information acquiring unit.

According to yet another embodiment of the present disclosure, there is provided a display control system including a plurality of display units, a position acquiring unit configured to acquire a positional relation of the plurality of display units, and a screen control unit configured to generate screens displayed on the plurality of display units as screens that are mutually associated based on the positional relation.

According to a further embodiment of the present disclosure, there is provided a display control method including acquiring a positional relation of a plurality of display units, and generating, by an arithmetic processing device, screens displayed on the plurality of display units as screens that are mutually associated based on the positional relation, and controlling the generated screens.

According to a still further embodiment of the present disclosure, there is provided a program for causing a computer to function as a plurality of display units, a position acquiring unit configured to acquire a positional relation of the plurality of display units, and a screen control unit configured to generate screens displayed on the plurality of display units as screens that are mutually associated based on the positional relation.

According to an embodiment of the present disclosure, since it is possible to perform screen generation and control based on a positional relation between the screen and the user or a positional relation between display units, it is possible to perform screen generation and control suitable for a large screen.

According to one or more of embodiments of the present disclosure, it is possible to perform screen generation and control suitable for a large screen.

The above effects are not necessarily limiting, and together with or instead of the above effects, effects described in this specification or other effects understood from this specification may be included.

BRIEF DESCRIPTION OF THE DRAWINGS

FIG. 2 is a block diagram illustrating an internal configuration of a display control device according to the first embodiment of the present disclosure;

FIG. 4 is a flowchart illustrating the first screen control example performed by the display control device according to the first embodiment;

FIG. 13 is an explanatory diagram for describing a fifth screen control example performed by the display control device according to the first embodiment;

FIG. 14 is an explanatory diagram for describing a fifth screen control example performed by the display control device according to the first embodiment;

FIG. 25 is a sequence diagram of the first screen control example performed by the display control system according to the second embodiment;

FIG. 28B is an explanatory diagram illustrating another exemplary screen in the third screen control example performed by the display control system according to the second embodiment;

FIG. 29 is an explanatory diagram for describing a hardware configuration of a display control device according to an embodiment of the present disclosure.

DETAILED DESCRIPTION OF THE EMBODIMENT(S)

Figure 1A:
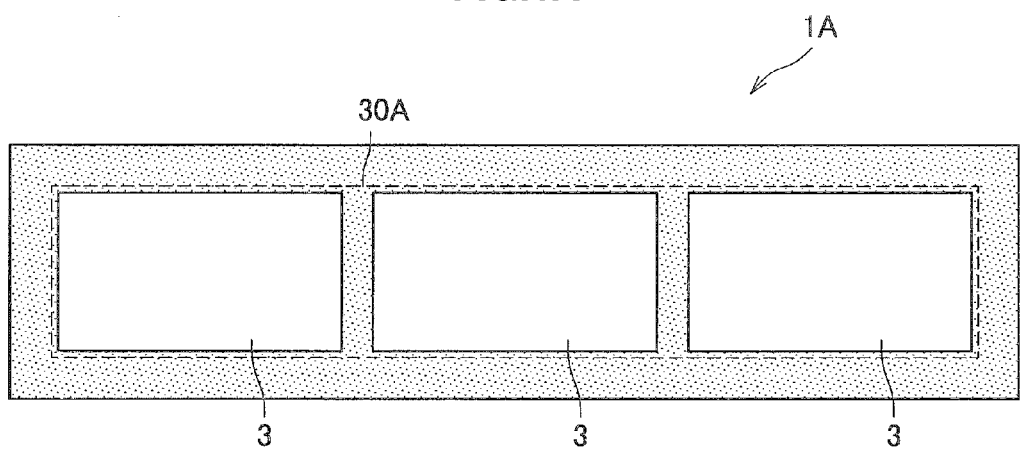
FIG. 1A is an explanatory diagram illustrating an exemplary exterior of a display control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 1B:
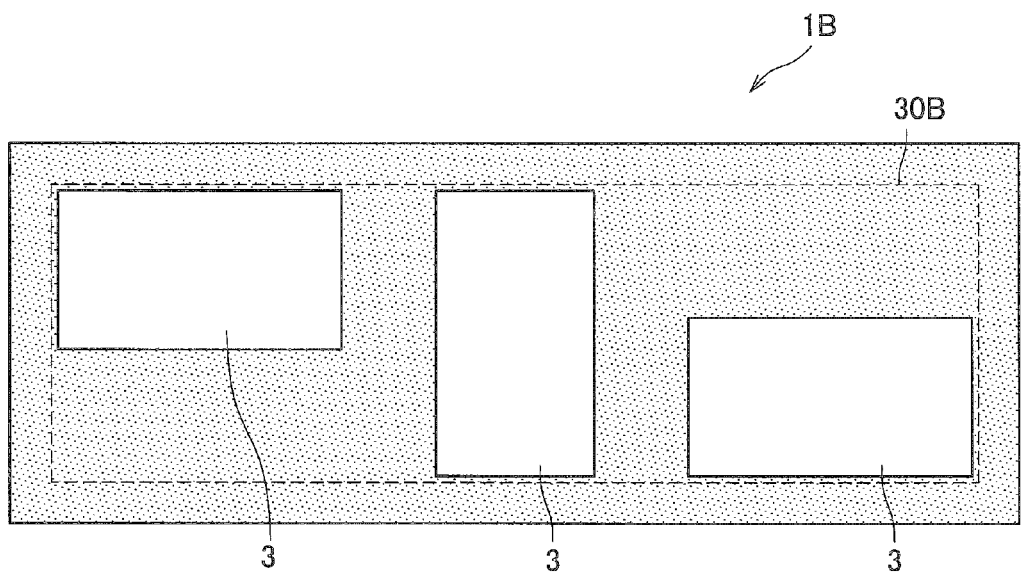
FIG. 1B is an explanatory diagram illustrating another exemplary exterior of a display control device according to an embodiment of the present disclosure.
Figure 1C:
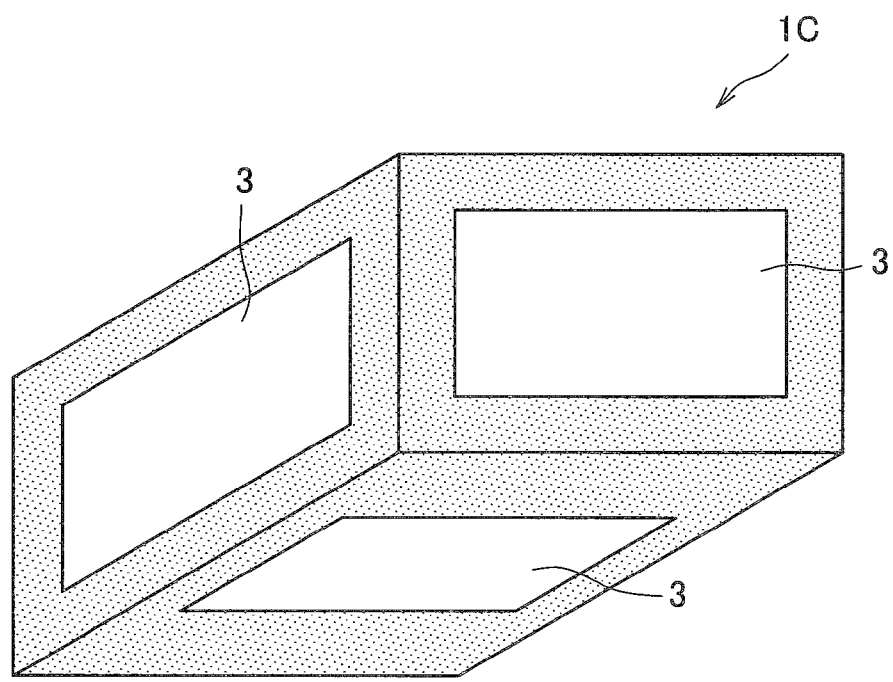
FIG. 1C is an explanatory diagram illustrating another exemplary exterior of a display control device according to an embodiment of the present disclosure.

The description will proceed in the following order.
1. Exemplary exterior of display control device according to embodiment of present disclosure
2. First embodiment
2.1. Configuration of display control device
2.2. Screen control examples of display control device
2.2.1. First screen control example
2.2.2. Second screen control example
2.2.3. Third screen control example
2.2.4. Fourth screen control example
2.2.5. Fifth screen control example
2.2.6. Sixth screen control example
2.2.7. Seventh screen control example
2.2.8. Eighth screen control example
3. Second embodiment
3.1. Configuration of display control system 3.2. Exemplary screen control of display control system
3.2.1. First screen control example
3.2.2. Second screen control example
3.2.3. Third screen control example
4. Exemplary hardware configuration of display control device according to embodiment of present disclosure 1. Exemplary Exterior of Display Control Device According to Embodiment of Present Disclosure First, an exemplary exterior of a display control device according to an embodiment of the present disclosure will be described with reference to FIGS. 1A to 1C. FIGS. 1A to 1C are explanatory diagram illustrating an exemplary exterior of a display control device according to an embodiment of the present disclosure.

As illustrated in FIGS. 1A to 1C, display control devices 1A to 1C according to an embodiment of the present disclosure include a plurality of display units 3. Here, the display control devices 1A to 1C integrally control screens to be displayed on the plurality of display units 3 such that a region including the plurality of display units 3 functions as a single display device.

Specifically, as illustrated in FIG. 1A, the display control device 1A may be a display device in which the plurality of display units 3 are consecutively arranged in a line at equal intervals in the transverse direction and integrated by an edge frame. Here, the display control device 1A controls the screens displayed by the plurality of display units 3 such that a region 30A surrounded by a dotted line in FIG. 1A functions as one display screen. Further, the region 30A in the display control device 1A may be an input device such as a touch panel in which a position input can be performed by contact in the entire region including the edge frame portion that is not included in the display units 3. For example, the display control device 1A is fixed on a wall or installed on a floor, a table, or the like and used.

The display control device 1A in FIG. 1A has the configuration in which the plurality of display units 3 are consecutively arranged in a line in the transverse direction, but the present disclosure is not limited to this example. For example, in the display control device 1A, the plurality of display units 3 may be consecutively in a plurality of rows in the transverse direction or may be arranged in a two-dimensional (2D) matrix form.

Further, the display control device 1B may be a display device in which a plurality of display units 3 are arranged in an arbitrary array and integrated by the edge frame as illustrated in FIG. 1B. Here, the display control device 1B controls the screens displayed by the plurality of display units 3 such that a region 30B surrounded by a dotted line in FIG. 1B functions as one display screen. Similarly to FIG. 1A, the region 30B in the display control device 1B may be an input device such as a touch panel in which a position input can be performed by contact in the entire region. Similarly to the display control device 1A of FIG. 1A, for example, the display control device 1B is fixed on a wall or installed on a floor, a table, or the like and used.

Further, the display control device 1C may be a display device in which a plurality of display units 3 are installed, for example, on a wall and a floor of one room as illustrated in FIG. 1C. Here, the display control device 1C controls the screens displayed by the plurality of display units 3 such that a wall, a floor, and a ceiling of a room function as one display screen. Each of the plurality of display units 3 may be a display input device such as a touch panel. The display unit may be installed, for example, at a ceiling, a table, or the like in addition to the places illustrated in FIG. 1C.

2. First Embodiment

Hereinafter, a display control device 100 according to the first embodiment of the present disclosure will be described with reference to FIGS. 2 to 23. First, an overview of the display control device 100 according to the first embodiment of the present disclosure including the background will be described.

The display control device 100 according to the first embodiment of the present disclosure is an information processing device capable of generating a screen in which objects are consecutively arranged in the transverse direction and controlling the screen based on user information including positional information of the user with respect to the generated screen. Specifically, the display control device 100 according to the first embodiment of the present disclosure is a display device including a horizontally long display unit as illustrated in FIGS. 1A and 1B or a display device illustrated in FIG. 1C.

In this specification, "horizontally long" represents that a screen is so long in a horizontal direction that, in order to view the screen, the user has to move or view the screen from afar. Further, "horizontally long" means that an aspect ratio of a transverse direction to a vertical direction of a screen is high.

Further, in this specification, an "object" is a display including content viewed by the user. For example, an "object" may be a window including an image and text or an icon indicating content.

Here, the display device (for example, a screen size is 20 inches or less) such as the tablet terminal disclosed in JP 2009-251303A is based on the premise of personal use rather than use by a plurality of users. Further, in a large screen display device (for example, a screen size is 50 inches or larger), a plurality of users can simultaneously enjoy one piece of content, but it is not assumed that a plurality of users view and use different content. In other words, even when a plurality of users view different content on a large screen, it is not assumed that screen generation and control of the generated screen are performed so that different content does not interfere.

Further, when a display device with a large screen is installed, for example, on a wall, a floor, a table, or the like, a positional relation between the users and the display device is not fixed, and the display device is used at various angles and positions from the users In this case, for example, even when the screen is controlled based on a line of sight of each user detected by a sensor, it is difficult to control the screen such that the users are provided with optimal operability and visibility.

In light of the above background, the inventor(s) of the present application developed the display control device 100 according to the first embodiment of the present disclosure. The display control device 100 according to the first embodiment of the present disclosure generates a screen in which objects are consecutively arranged in the transverse direction, and thus a plurality of users can view different content side by side. Further, the display control device 100 according to the first embodiment of the present disclosure controls the screen based on the user information including the positional information of the user with respect to the screen and thus can improve operability and visibility for each user.

[2.1. Configuration of Display Control Device]

Next, a configuration of the display control device 100 according to the first embodiment of the present disclosure will be described with reference to FIG. 2. FIG. 2 is a block diagram illustrating an internal configuration of the display control device 100 according to the first embodiment of the present disclosure.

As illustrated in FIG. 2, the display control device 100 according to the first embodiment of the present disclosure includes a sensor unit 101, a user information acquiring unit 103, a content storage unit 105, a communication unit 107, a screen control unit 109, and display units 111-1 to 111-N.

The sensor unit 101, and the display units 111-1 to 111-N may be equipped outside the display control device 100. In this case, the sensor unit 101 and the display units 111-1 to 111-N are connected with the display control device 100 directly or via a network such as a public network 5, and perform functions through communication.

The sensor unit 101 includes various kinds of sensors used to detect a state of the user. Specifically, the sensor unit 101 may include a position sensor that detects a positional relation of the user with respect to the screen, a line of sight sensor that detects the line of sight of the user, a motion sensor that detects a motion of the user, a voice sensor that detects the user's voice, a touch sensor that detects a touch performed by the user, a face authentication sensor and a biometric authentication sensor that identify an individual user, and the like.

The user information acquiring unit 103 acquires various kinds of user information detected by the sensor unit 101 from the sensor unit 101. Further, the user information acquiring unit 103 may acquire account information of the user, a setting set by the user on the display unit 111, and the like from a storage device of the display control device 100.

The screen control unit 109 generates screens displayed on the display units 111-1 to 111-N, and controls the generated screens based on various kinds of user information acquired by the user information acquiring unit 103.

Specifically, the screen control unit 109 acquires various kinds of content from the content storage unit 105 and the communication unit 107, and generates objects including the various kinds of acquired content. Further, the screen control unit 109 generates a screen in which the objects including the various kinds of generated content are consecutively arranged in the transverse direction.

For example, the screen control unit 109 may generate the screen such that the objects are each displayed on the display units 3 of the display control device 1A illustrated in FIG. 1A. Further, the screen control unit 109 may generate the screen such that a plurality of objects are displayed on each of the display units 3 of the display control device 1A illustrated in FIG. 1A. Furthermore, the screen control unit 109 may generate the screen such that one object is displayed throughout the plurality of display units 3.

In addition, the screen control unit 109 controls the generated screen based on various kinds of user information acquired by the user information acquiring unit 103. Exemplary screen control of the screen control unit 109 will be described in detail in [2.2. Exemplary screen control of display control device].

The content storage unit 105 stores various kinds of content. For example, the content storage unit 105 stores various kinds of content such as text, an image, a moving image, and a sound.

The communication unit 107 is connected with the public network 5, and performs transmission and reception of information. Specifically, the communication unit 107 receives various kinds of content such as text, an image, a moving image, and a sound from the public network 5. For example, the public network 5 may be a public line network such as the Internet, a satellite communication network, or a telephone line network, a local area network (LAN), a wide area network (WAN), or the like.

The display units 111-1 to 111-N display the screen generated by the screen control unit 109. Specifically, the display units 111-1 to 111-N are integrally controlled by the screen control unit 109, and the screen is displayed such that the region including all the display units 111-1 to 111-N is one display unit.

For example, the display units 111-1 to 111-N may be display devices such as a liquid crystal display (LCD) device, an organic light emitting diode (OLED) display device, a plasma display device, or a cathode ray tube (CRT) display device. Further, the display units 111-1 to 111-N may be touch panel devices.

[2.2. Screen Control Examples of Display Control Device]

Next, screen control examples (first to eighth screen control examples) performed by the display control device 100 according to the first embodiment of the present disclosure will be described with reference to FIGS. 3A to 22.

(2.2.1. First Screen Control Example)

Figure 3A:
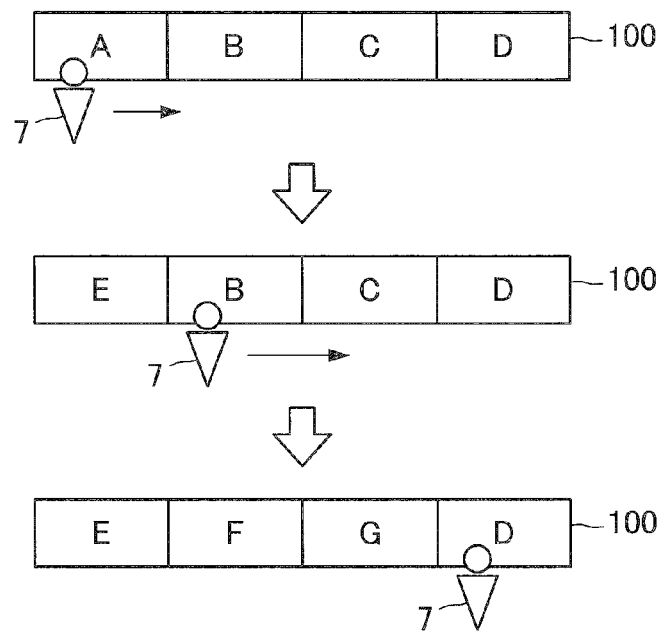
FIG. 3A is an explanatory diagram for describing a first screen control example performed by the display control device according to the first embodiment.
Figure 3B:
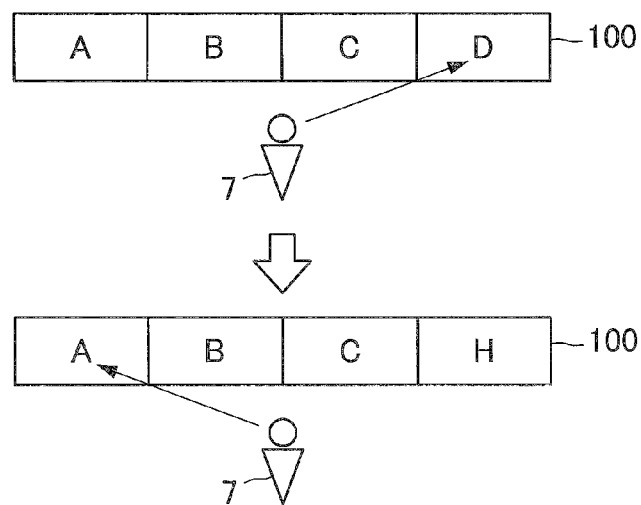
FIG. 3B is an explanatory diagram for describing a first screen control example performed by the display control device according to the first embodiment.

First, the first screen control example performed by the display control device 100 will be described with reference to FIGS. 3A to 4. FIGS. 3A and 3B are explanatory diagrams for describing the first screen control example performed by the display control device 100, and FIG. 4 is a flowchart illustrating the first screen control example performed by the display control device 100.

Here, the first screen control example is a screen control example in which the screen control unit 109 determines whether or not the user has already read the displayed object based on the positional information and the line of sight information of the user acquired by the user information acquiring unit 103 and changing a display of the object determined to have already been read.

Specifically, as illustrated in FIG. 3A, the objects A, B, C, and D are displayed on the display control device 100, and a user 7 is viewing the objects displayed on the display control device 100.

First, the user 7 is observing the object A while facing the front of the display of the object A with respect to the screen as illustrated in an upper portion of FIG. 3A. Then, when the user 7 moves to the front of the display of the object B as illustrated in a middle portion of FIG. 3A, the user information acquiring unit 103 acquires a change (a movement from the front of the object A to the front of the object B) of the positional information of the user detected by the sensor unit 101. Further, the screen control unit 109 determines the object A to have already been read based on the positional information of the user acquired by the user information acquiring unit 103, and replaces the display of the object A with a display of an object E.

Further, when the user 7 moves to the front of the display of the object D as illustrated in a lower portion of FIG. 3A, the user information acquiring unit 103 acquires a change (a movement from the front of the object B to the front of the object D) of the positional information of the user detected by the sensor unit 101. Here, the screen control unit 109 determines the objects B and C to have already been read based on the positional information of the user acquired by the user information acquiring unit 103, replaces the display of the object B with the display of the object E, and replaces the display of the object C with a display of an object G.

The determination as to whether or not the object has already been read may be performed based on a period of time for which the user 7 has stayed in front of the object. Specifically, when the period of time for which the user 7 has stayed in front of the object exceeds a threshold value, the screen control unit 109 may determine the object to have already been read. According to this configuration, when the user 7 has passed in front of the object without checking the object, the screen control unit 109 can prevent the object from being erroneously determined to have already been read.

Another aspect of the first screen control example will be described with reference to FIG. 3B. As illustrated in FIG. 3B, the objects A, B, C, and D are displayed on the display control device 100, and the user 7 is viewing the objects displayed on the display control device 100.

First, as illustrated in an upper portion of FIG. 3B, the user 7 is observing the object D while facing between the objects B and C with respect to the screen. Then, when the user 7 changes the object that he or she is observing to the object A without moving as illustrated in a lower portion of FIG. 3B, the user information acquiring unit 103 acquires a change (a movement of a line of sight from the object D to the object A) of the line of sight information of the user detected by the sensor unit 101. Here, the screen control unit 109 determines the object D to have already been read based on the line of sight information of the user acquired by the user information acquiring unit 103, and replaces the display of the object D with a display of an object H.

The determination as to whether or not the object has already been read may be performed based on a period of time for which the user 7 has observed the object. Specifically, when a period of time for which the user 7 has directed his/her line of sight toward the same object exceeds a threshold value, the screen control unit 109 may determine the object to have already been read. According to this configuration, when the user 7 has not observed the object, the screen control unit 109 can prevent the object from being erroneously determined to have already been read.

Next, the flow of an operation of the display control device 100 in the first screen control example will be described with reference to FIG. 4. As illustrated in FIG. 4, first, the user information acquiring unit 103 acquires the positional information and the line of sight information of the user 7 detected by the sensor unit 101 (S101). Then, the screen control unit 109 determines an object in which the user 7 is interested based on the acquired positional information and line of sight information of the user 7 (S103).

Further, the screen control unit 109 determines whether or not the user 7 has caused a target of interest to transition to another object (S105). When the user 7 has not caused a target of interest to transition to another object (No in S105), the display control device 100 returns to S101 and acquires the positional information and the line of sight information of the user 7 again. However, when the user 7 has caused a target of interest to transition to another object (Yes in S105), the screen control unit 109 determines whether or not an interest period of time for the object of interest before the transition exceeds a threshold value (S107).

Here, when the interest period of time for the object of interest before the transition does not exceed the threshold value (No in S107), the screen control unit 109 determines the object of interest before the transition not to have not been read yet, and the operation ends. However, when the interest period of time for the object of interest before the transition exceeds the threshold value (Yes in S107), the screen control unit 109 determines that the object of interest before the transition has already been read (S109). Then, the screen control unit 109 replaces the object of interest before the transition determined to have already been read with an object including other content (S111).

According to the first screen control example, the user 7 can successively change an object by an operation of moving to the front of the display control device 100 and reading content included in an object without directly operating the display control device 100.

Further, in the first screen control example, the screen control unit 109 may set a bookmark for an object in which the user 7 is determined to be interested and store the object for which the bookmark is set. Specifically, when a period of time for which the user 7 has stayed in front of an object or a period of time for which the user 7 has directed his/her line of sight toward the same object exceeds a bookmark determination threshold value, the screen control unit 109 may set a bookmark for an object in which the user 7 is determined to be interested. Further, the screen control unit 109 may store the object for which the bookmark is set in the storage device of the display control device 100. Here, it is desirable that the bookmark determination threshold value be larger than a read determination threshold value (that is, the interest period of time is larger).

The setting of the bookmark for the object and the storage of the object may be performed according to a certain motion or operation performed by the user 7. For example, the setting of the bookmark for the object and the storage of the object may be performed when the user 7 says "bookmark," when the user 7 performs a motion such as "nodding," when the user 7 moves his/her line of sight downward from the object, when the user 7 performs a previously set touch operation, or the like.

(2.2.2. Second Screen Control Example)

Figure 5:
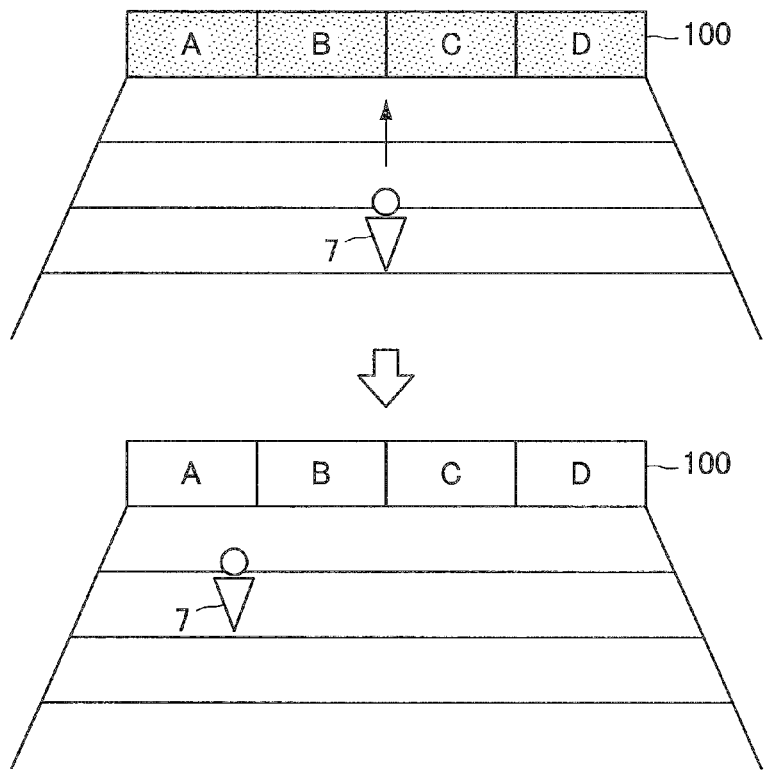
FIG. 5 is an explanatory diagram for describing a second screen control example performed by the display control device according to the first embodiment.
Figure 6:
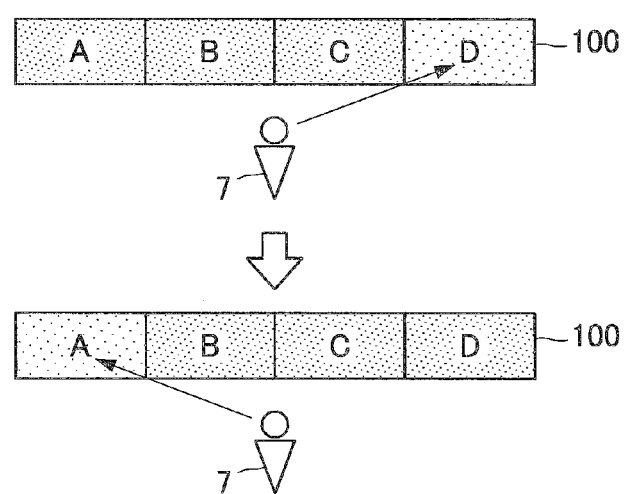
FIG. 6 is an explanatory diagram for describing a second screen control example performed by the display control device according to the first embodiment.
Figure 7:
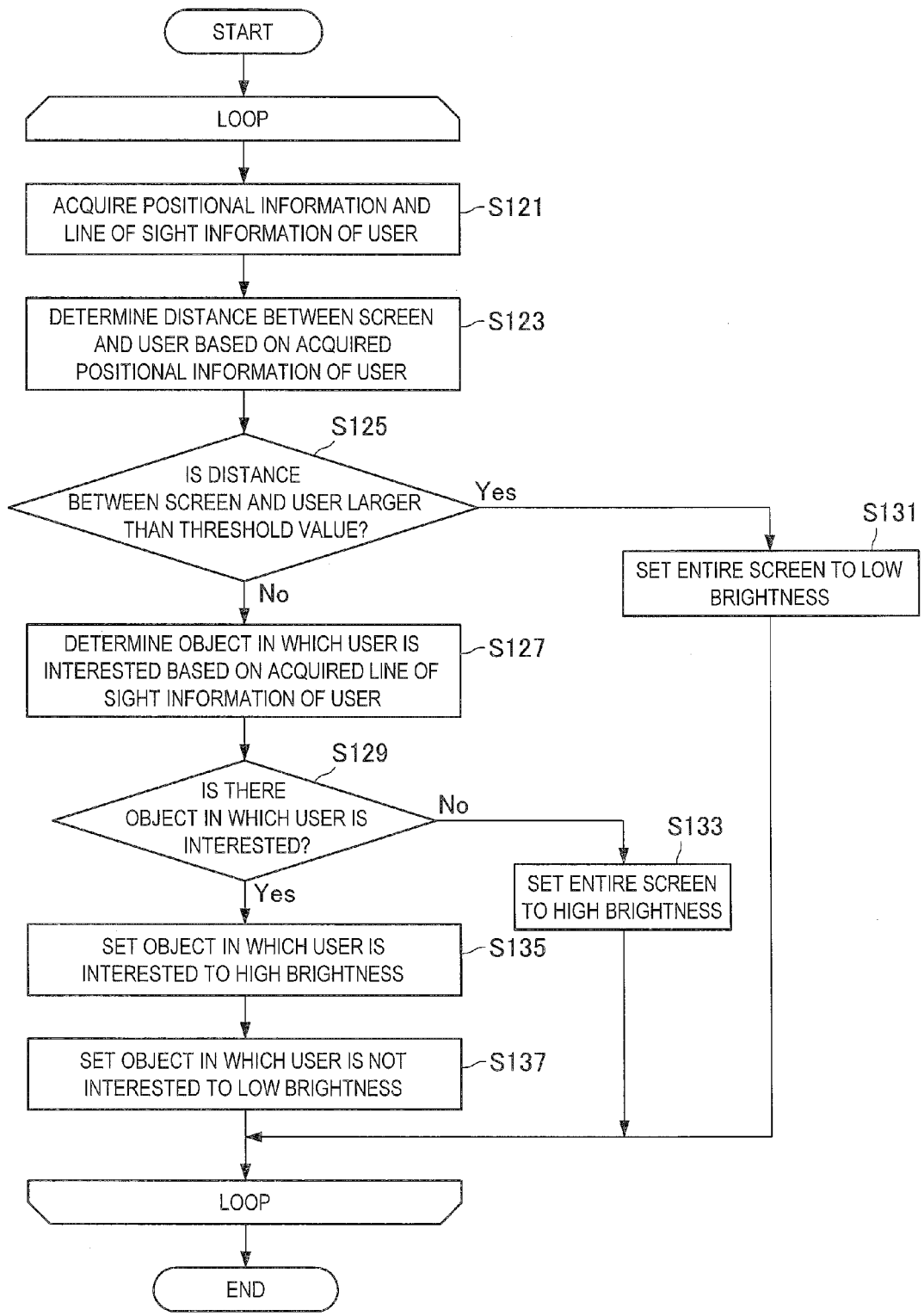
FIG. 7 is a flowchart illustrating the second screen control example performed by the display control device according to the first embodiment.

Next, the second screen control example performed by the display control device 100 will be described with reference to FIGS. 5 to 7. FIGS. 5 and 6 are explanatory diagrams for describing the second screen control example performed by the display control device 100, and FIG. 7 is a flowchart illustrating the second screen control example performed by the display control device 100.

Here, the second screen control example is a screen control example in which the screen control unit 109 controls brightness of the screen based on the positional information and the line of sight information of the user acquired by the user information acquiring unit 103.

Specifically, as illustrated in FIG. 5, the objects A, B, C, and D are displayed on the display control device 100, and the user 7 is viewing the objects displayed on the display control device 100 at a long distance or a short distance. When a distance between the user 7 and the screen of the display control device 100 is a long distance (for example, 1 m or more) as illustrated in an upper portion of FIG. 5, control is performed such that the entire screen of the display control device 100 has low brightness. Further, when the user 7 approaches the display control device 100 and a distance between the user 7 and the screen of the display control device 100 becomes a short distance (for example, less than 1 m) as illustrated in a lower portion of FIG. 5, the screen control unit 109 performs control such that the entire screen of the display control device 100 has high brightness.

Another aspect of the second screen control example will be described with reference to FIG. 6. As illustrated in FIG. 6, the objects A, B, C, D are displayed on the display control device 100, and the user 7 is viewing the objects displayed on the display control device 100 at a short distance (for example, less than 1 m).

As illustrated in an upper portion of FIG. 6, the user 7 is observing the object D while facing between the objects B and C with respect to the screen. At this time, the user information acquiring unit 103 acquires the line of sight information of the user detected by the sensor unit 101, and the screen control unit 109 performs control such that the object D in which the user 7 is interested has high brightness, and the other objects A, B, and C have low brightness. Further, as illustrated in a lower portion of FIG. 6, when the user 7 changes an object that he or she is observing to the object A, the line of sight information of the user detected by the sensor unit 101 is acquired, and the screen control unit 109 performs control such that the object A in which the user 7 is interested has high brightness, and the other objects B, C, and D have low brightness.

The second screen control examples described with reference to FIGS. 5 and 6 may be combined and executed. Specifically, when it is difficult to detect the line of sight information of the user 7 through the sensor unit, the screen control unit 109 may control the brightness of the screen based on only the positional information of the user. Further, when it is possible to detect the line of sight information of the user 7 through the sensor unit, the screen control unit 109 may control the brightness of the screen based on the line of sight information of the user or may control the brightness of the screen based on both of the line of sight information and the positional information of the user.

Next, the flow of an operation of the display control device 100 in the second screen control example will be described with reference to FIG. 7. As illustrated in FIG. 7, first, the user information acquiring unit 103 acquires the positional information and the line of sight information of the user 7 detected by the sensor unit 101 (S121). Then, the screen control unit 109 determines a distance between the user 7 and the screen of the display control device 100 based on the acquired positional information of the user 7 (S123).

Then, the screen control unit 109 determines whether or not the distance between the user 7 and the screen of the display control device 100 is larger than a threshold value (S125). When the distance between the user 7 and the screen of the display control device 100 is a long distance larger than the threshold value (Yes in S125), the screen control unit 109 performs control such that the entire screen has low brightness (S131). Here, the threshold value for the determination of S125 may be, for example, a value within a range of 1 m to 3 m.

Meanwhile, when the distance between the user 7 and the screen of the display control device 100 is a short distance smaller than the threshold value (No in S125), the screen control unit 109 determines an object in which the user 7 is interested based on the acquired line of sight information of the user 7 (S127). Then, the screen control unit 109 determines whether or not there is an object in which the user 7 is interested (S129). Here, when the screen control unit 109 determines that there is no object in which the user 7 is interested (including when it is difficult to determine an object in which the user 7 is interested based on the line of sight information of the user 7) (No in S129), the screen control unit 109 performs control such that the entire screen has high brightness (S133).

However, when the screen control unit 109 determines that there is an object in which the user 7 is interested (Yes in S129), the screen control unit 109 performs control such that the object in which the user 7 is interested has high brightness (S135). Further, the screen control unit 109 performs control such that an object in which the user is not interested has low brightness (S137). Furthermore, the display control device 100 loops to S121, repeats the above operation, and controls the brightness of the screen as necessary each time the positional information and the line of sight information of the user are updated.

According to the second screen control example, the display control device 100 can display an object in which the user 7 is interested with high brightness and thus improves the visibility of the screen for the user 7. Further, the display control device 100 can display other objects in which the user 7 is not interested with low brightness and thus can reduce power consumption of the display units 111-1 to 111-N.

(2.2.3. Third Screen Control Example)

Figure 8:
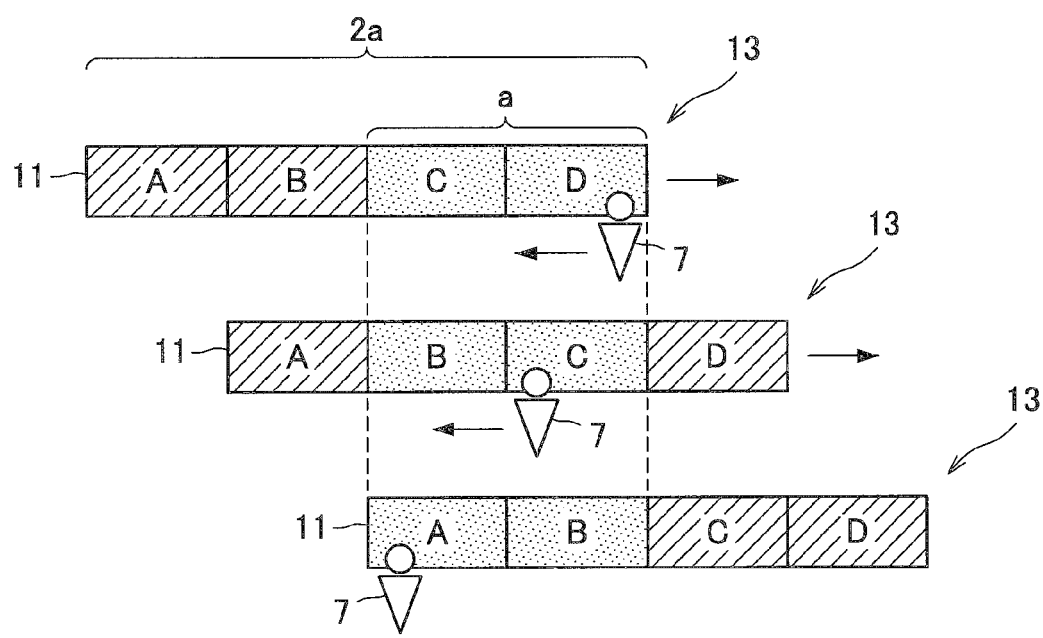
FIG. 8 is an explanatory diagram for describing a third screen control example performed by the display control device according to the first embodiment.
Figure 9A:
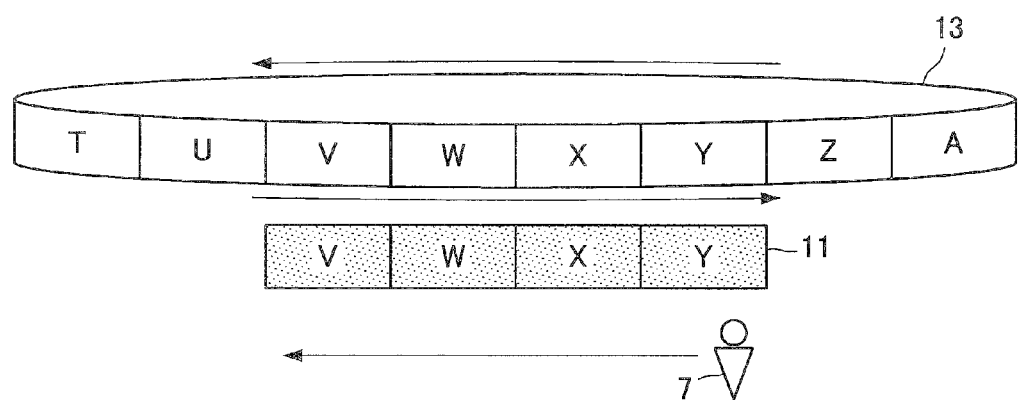
FIG. 9A is an explanatory diagram for describing another example of a third screen control example performed by the display control device according to the first embodiment.
Figure 9B:
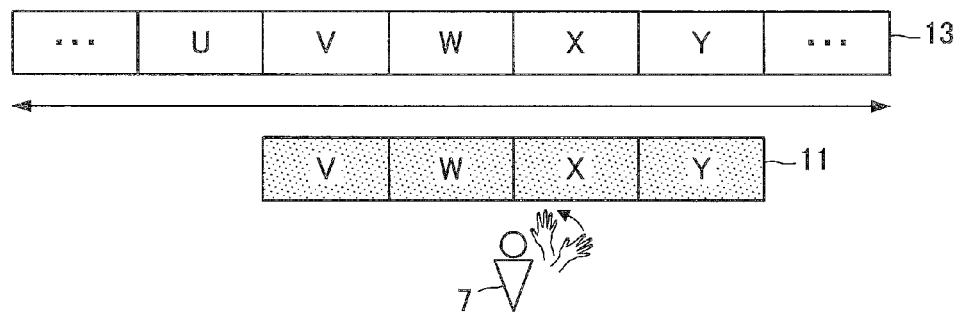
FIG. 9B is an explanatory diagram for describing another example of a third screen control example performed by the display control device according to the first embodiment.
Figure 10:
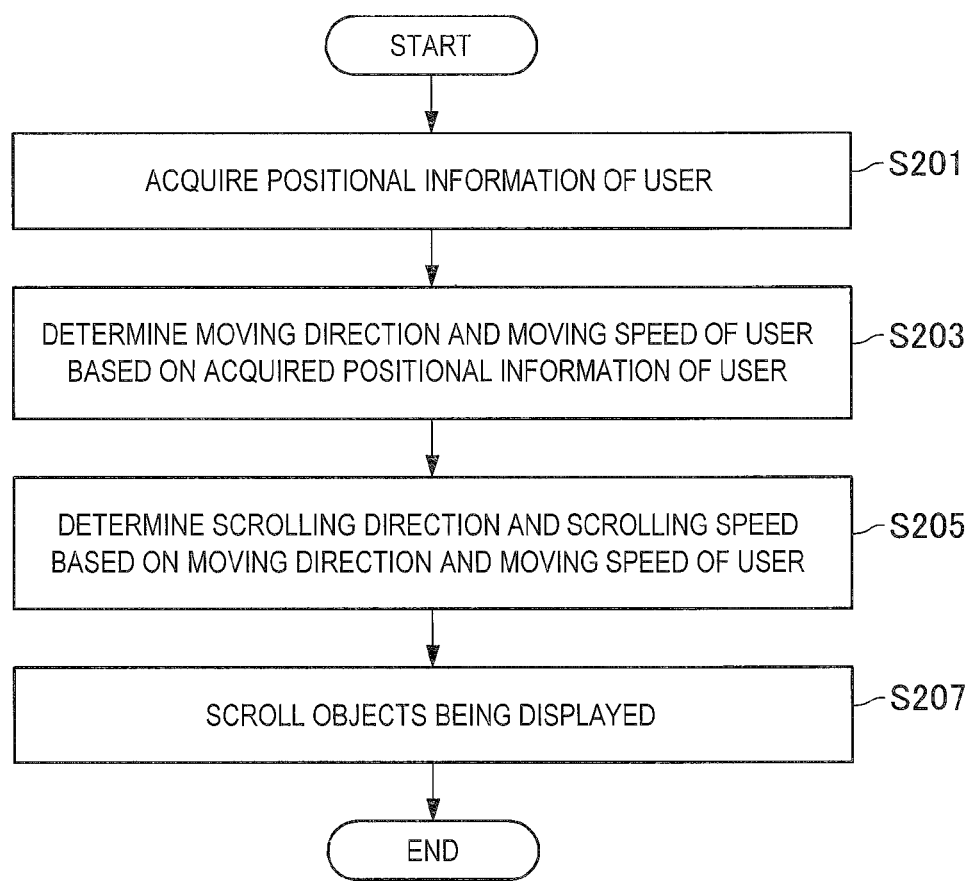
FIG. 10 is a flowchart illustrating the third screen control example performed by the display control device according to the first embodiment.

Next, the third screen control example performed by the display control device 100 will be described with reference to FIGS. 8 to 10. FIG. 8 is an explanatory diagram for describing the third screen control example performed by the display control device 100, and FIGS. 9A and 9B are explanatory diagrams for describing another example of the third screen control example performed by the display control device 100. FIG. 10 is a flowchart illustrating the third screen control example performed by the display control device 100.

Here, the third screen control example is a screen control example in which the screen control unit 109 controls a scrolling direction and speed of a displayed object based on the positional information of the user acquired by the user information acquiring unit 103.

Specifically, as illustrated in an upper portion of FIG. 8, the display control device 100 generates display data 13 including objects A, B, C and D. Of the objects, only objects included in an actual display region 11 are displayed on the display units 111-1 to 111-N of the display control device 100. For example, in the upper portion of FIG. 8, the objects C and D are included in the actual display region 11 and displayed on the display units 111-1 to 111-N. The length of the actual display region 11 including the objects C and D in the transverse direction is, for example, "a," and the length of the display data 13 including the objects A, B, C and D in the transverse direction is, for example, "2a."

Here, when the user 7 moves toward the object C from the object D while viewing the screen of the display control device 100 as illustrated in a middle portion of FIG. 8, the screen control unit 109 scrolls the display data 13 in the direction opposite to the moving direction of the user 7 at the same speed of the moving speed of the user 7. In the middle portion of FIG. 8, since the user 7 has moved a distance of "½a," the screen control unit 109 scrolls the display data 13 by "½a" in the direction opposite to the moving direction of the user 7. Thus, in the middle portion of FIG. 8, the objects B and C included in the actual display region 11 are displayed on the display units 111-1 to 111-N.

Further, when the user 7 has moved a distance of "a" as illustrated in a lower portion of FIG. 8, the screen control unit 109 scrolls the display data 13 by "a" in the direction opposite to the moving direction of the user 7. Thus, in the lower portion of FIG. 8, the objects A and B included in the actual display region 11 are displayed on the display units 111-1 to 111-N.

Thus, in the third screen control example, the objects are scrolled based on the moving direction and the moving speed of the user 7, and thus the objects corresponding to the length of the distance by which the user 7 has moved or more can be displayed. Specifically, in the example of FIG. 8, as the user 7 moves by the distance of "a," the display data 13 is scrolled in the direction opposite to the moving direction of the user by the distance of "a," and thus the user 7 can consequently view the objects A to D corresponding to the length of "2a."

In the above description, the scrolling speed of the display data 13 is set to the same speed as the moving speed of the user 7, but the third screen control example is not limited to this example. For example, the scrolling speed of the display data 13 may be a speed obtained by adding an arbitrary magnification N equal to or larger than 1 to the moving speed of the user 7.

Further, in the third screen control example, the scrolling direction of the display data 13 may be set to the same direction as the moving direction of the user 7, and the scrolling speed of the display data 13 may be set to be slower than the moving speed of the user 7 (that is, may be a speed obtained by adding an arbitrary magnification M less than 1 to the moving speed of the user 7). According to this configuration, when a landscape or the like is displayed on the screen of the display control device 100, it is possible to apply a visual effect similar to as if a camera angle of the displayed landscape were changed as the user 7 moves.

Next, another aspect of the third screen control example will be described with reference to FIGS. 9A and 9B. For example, as illustrated in FIG. 9A, the display data 13 may be ring-like data in which both ends in the transverse direction are connected. According to this configuration, the user 7 can view all objects included in the display data 13 by merely scrolling the display data 13 in one direction.

Further, as illustrated in FIG. 9B, the screen control unit 109 may scroll the display data 13 according to a motion or touch operation of the user 7. For example, the screen control unit 109 may scroll the display data 13 according to a motion of the user 7 waving his/her hand or a motion of pressing an object sidewise. Further, the screen control unit 109 may scroll the display data 13 according to a "slide" operation of the user 7 sliding in one direction after touching the screen.

Next, the flow of an operation of the display control device 100 in the third screen control example will be described with reference to FIG. 10. As illustrated in FIG. 10, first, the user information acquiring unit 103 acquires the positional information of the user 7 detected by the sensor unit 101 (S201). Then, the screen control unit 109 determines the moving direction and the moving speed of the user 7 based on the acquired positional information of the user 7 (S203).

Then, the screen control unit 109 determines the scrolling direction and the scrolling speed of the display data 13 based on the moving direction of the user 7 and the moving speed (S205). Here, when the scrolling direction is opposite to the moving direction of the user, the scrolling speed may be set to be equal to or faster than the moving speed of the user 7, and when the scrolling direction is the same as the moving direction of the user, the scrolling speed may be less than the moving speed of the user 7. Further, the screen control unit 109 scrolls the objects being displayed by scrolling the display data 13 (S207).

According to the third screen control example, the display control device 100 can scroll the display data 13 with the movement of the user 7 and display the objects corresponding to the length equal to or larger than the moving distance of the user. Further, when a landscape or the like is displayed, the display control device 100 can give a visual effect similar to as if a camera angle were moving to follow the movement of the user.

(2.2.4. Fourth Screen Control Example)

Figure 11A:
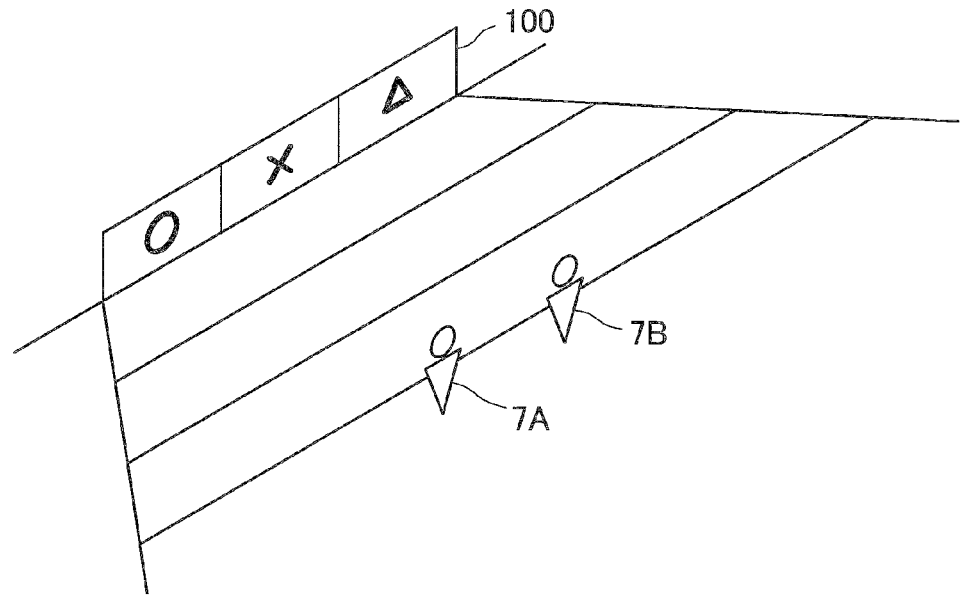
FIG. 11A is an explanatory diagram for describing a fourth screen control example performed by the display control device according to the first embodiment.
Figure 11B:
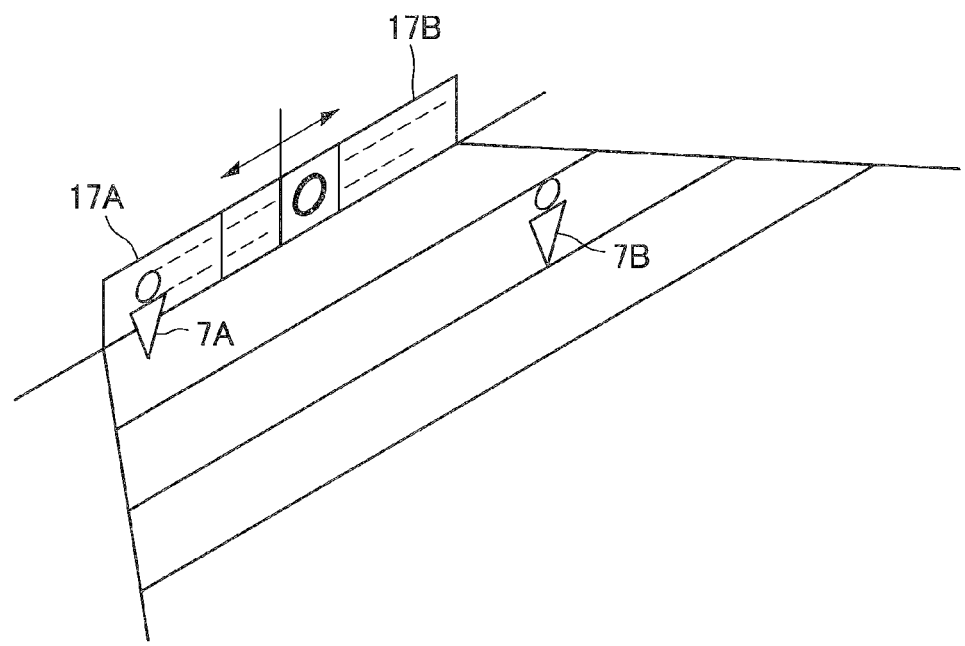
FIG. 11B is an explanatory diagram for describing a fourth screen control example performed by the display control device according to the first embodiment.
Figure 12:
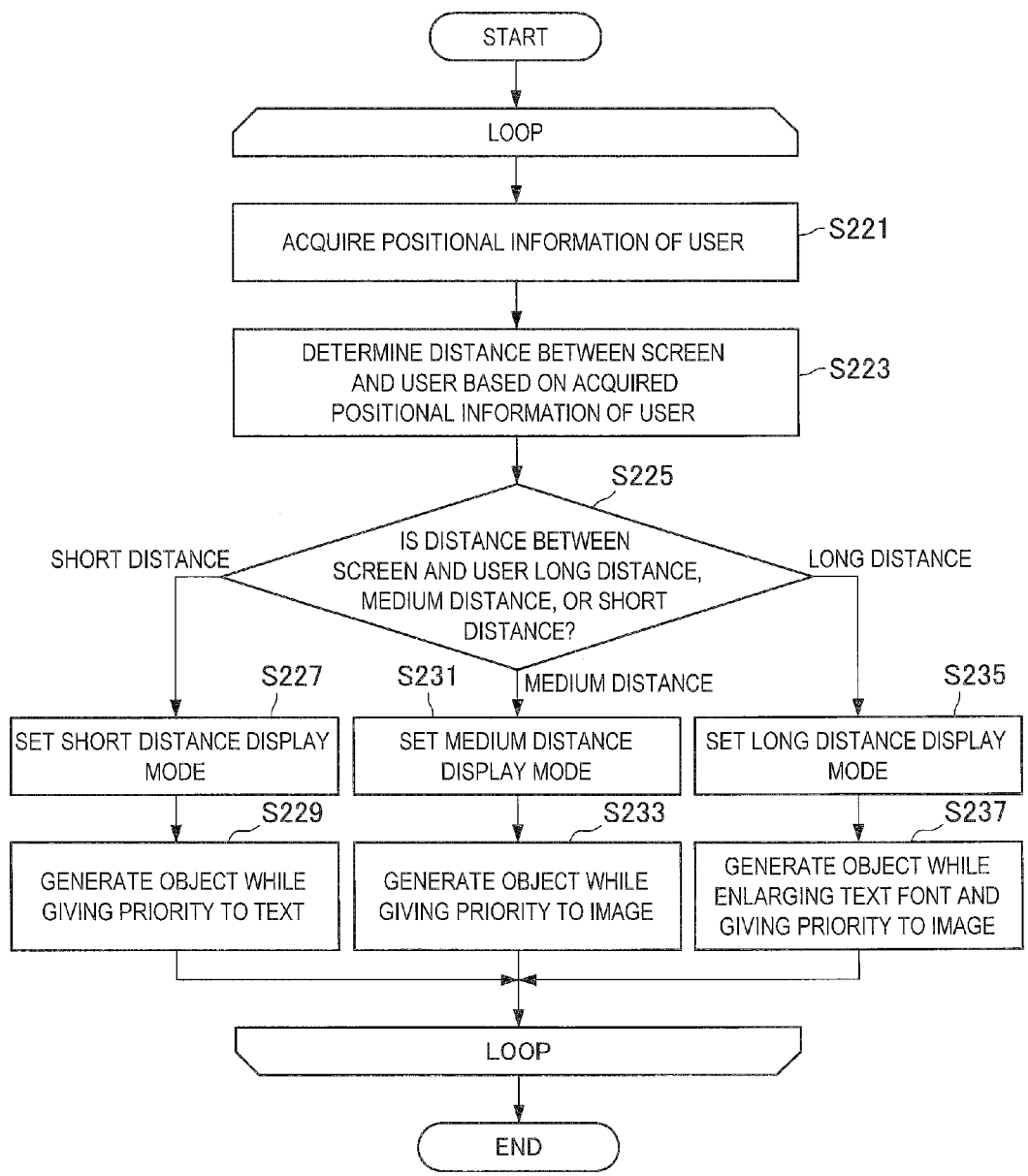
FIG. 12 is a flowchart illustrating the fourth screen control example performed by the display control device according to the first embodiment.

Next, the fourth screen control example performed by the display control device 100 will be described with reference to FIGS. 11A to 12. FIGS. 11A and 11B are explanatory diagrams for describing the fourth screen control example performed by the display control device 100, and FIG. 12 is a flowchart illustrating the fourth screen control example performed by the display control device 100.

Here, the fourth screen control example is a screen control example in which the screen control unit 109 controls information amount of content included in an object based on the positional information of the user acquired by the user information acquiring unit 103. In other words, in the fourth screen control example, for example, a layout, a ratio of text and an image, a font size, or an image size of an object displayed on the screen is changed based on the distance between the user and the screen of the display control device 100.

Specifically, as illustrated in FIG. 11A, the objects are displayed on the display control device 100, and a plurality of users of users 7A and 7B are viewing the objects.

As illustrated in FIG. 11A, when a distance between each of the users 7A and 7B and the screen of the display control device 100 is a long distance (for example, 3 m or more), the screen control unit 109 minimizes an information amount of content included in the displayed object. More specifically, the screen control unit 109 causes image information in content to be enlarged and preferentially displayed on an object, causes text information in content to be reduced, and causes a font size of text information to be increased and displayed.

Further, as illustrated in FIG. 11B, when a distance between the user 7A and the screen of the display control device 100 is a short distance (for example, less than 1 m), the screen control unit 109 maximizes information amount of content included in the displayed object. More specifically, the screen control unit 109 causes text information in content to be preferentially displayed on an object, and causes image information in content to be displayed in an equal or reduced size.

Further, as illustrated in FIG. 11B, when a distance between the user 7B and the screen of the display control device 100 is a medium distance (for example, equal to or larger than 1 m and less than 3 m), the screen control unit 109 sets an information amount of content included in the displayed object between the long distance and the short distance. More specifically, the screen control unit 109 causes image information in content to be preferentially displayed on an object, and causes text information in content to be displayed in a medium font size.

Further, when there are a plurality of users as illustrated in FIG. 11B, the screen control unit 109 may perform control such that a partial range of the screen of the display control device 100 is associated with each user. Here, it is desirable that the partial range of the screen of the display control device 100 associated with the user include a range in front of each user for the sake of visibility and operability for the users.

Specifically, as illustrated in FIG. 11B, a partial range 17A of the screen of the display control device 100 is associated with the user 7A, and control is performed such that an information amount of content included in an object is maximized based on a distance (a short distance) between the user 7A and the partial range 17A of the screen. Further, a partial range 17B of the screen of the display control device 100 is associated with the user 7B, and control is performed such that an information amount of content included in an object is between the short distance and the long distance based on a distance (a medium distance) between the user 7B and the partial range 17B of the screen.

In order to explicitly set the partial range, the association between the partial range of the screen of the display control device 100 and the user is preferably performed when a distance between the user 7 and the screen of the display control device 100 is from a short distance to a medium distance (for example, less than 3 m).

Further, the association between the partial range of the screen of the display control device 100 and the user can be used not only to control the layout of the object for each user, but also individualize the object displayed in the partial range of the screen for the associated user.

Specifically, the object displayed in the partial range of the screen may be associated with the account information of the user associated with the partial range as well. In other words, when the object displayed in the partial range of the screen is associated with a payment account of the user associated with the partial range, a plurality of users can shop individually and make payments separately using the same display control device 100. In this configuration, for example, user authentication can be performed by face authentication using a camera or the like included in the sensor unit 101 of the display control device 100. Further, when device authentication, fingerprint authentication, or the like is used for the user authentication, it is desirable to arrange a separate authentication module near each of the display units 111-1 to 111-N of the display control device 100.

Next, the flow of an operation of the display control device 100 in the fourth screen control example will be described will be described with reference to FIG. 12. As illustrated in FIG. 12, first, the user information acquiring unit 103 acquires the positional information of the user 7 detected by the sensor unit 101 (S221). Then, the screen control unit 109 determines the distance between the user 7 and the screen of the display control device 100 based on the acquired positional information of the user 7 (S223).

Then, the screen control unit 109 determines whether the distance between the user 7 and the screen of the display control device 100 is the short distance, the medium distance, or the long distance (S225). The determination of S225 may be performed using a threshold value. For example, the distance between the user 7 and the screen of the display control device 100 of less than 1 m may be determined to be the short distance, the distance of 1 m or larger and less than 3 m may be determined to be medium distance, and the distance of 3 m or larger may be determined to be the long distance.

When the distance between the user 7 and the screen of the display control device 100 is the short distance (short distance in S225), the screen control unit 109 sets the partial range associated with the user 7 to a short distance display mode (S227), and generates an object while giving priority to text (S229). Further, when the distance between the user 7 and the screen of the display control device 100 is the medium distance (medium distance in S225), the screen control unit 109 sets the partial range associated with the user 7 to a medium distance display mode (S231), and generates an object while giving priority to image information (S233). Furthermore, when the distance between the user 7 and the screen of the display control device 100 is the long distance (long distance in S225), the screen control unit 109 sets the partial range associated with the user 7 to a long distance display mode (S235), and generates an object while giving priority to image information and increasing a font size of text information (S237).

Further, the display control device 100 loops to S221, repeats the above operation, changes, for example, a layout of an object, a ratio of text and an image, a font size, or an image size as necessary each time the positional information of the user is updated, and generates an object.

According to the fourth screen control example, the display control device 100 can optimize an information amount of content included in an object to be displayed based on the distance between the user 7 and the screen of the display control device 100. Thus, the display control device 100 can display information having high visibility such as an image when the distance from the user 7 is the long distance and display information having a great information amount such as text when the distance from the user is the short distance.

(2.2.5. Fifth Screen Control Example)

Figure 15A:
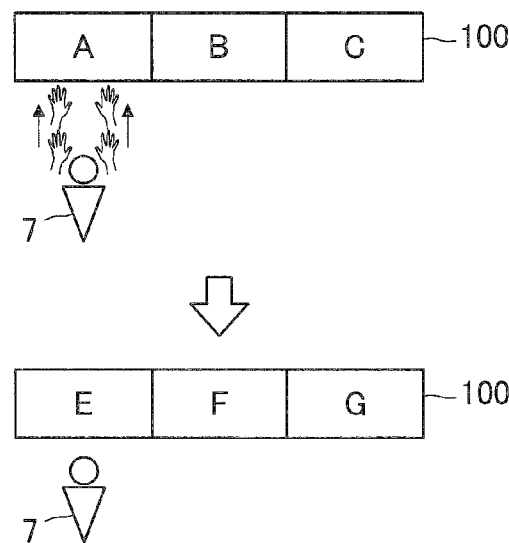
FIG. 15A is an explanatory diagram for describing a fifth screen control example performed by the display control device according to the same embodiment when each user is associated with a partial range of a screen.
Figure 15B:
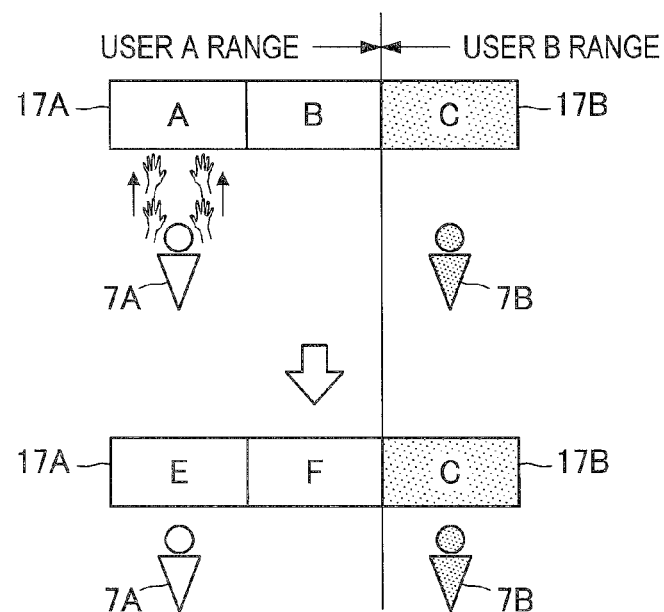
FIG. 15B is an explanatory diagram for describing a fifth screen control example performed by the display control device according to the same embodiment when each user is associated with a partial range of a screen.
Figure 16:
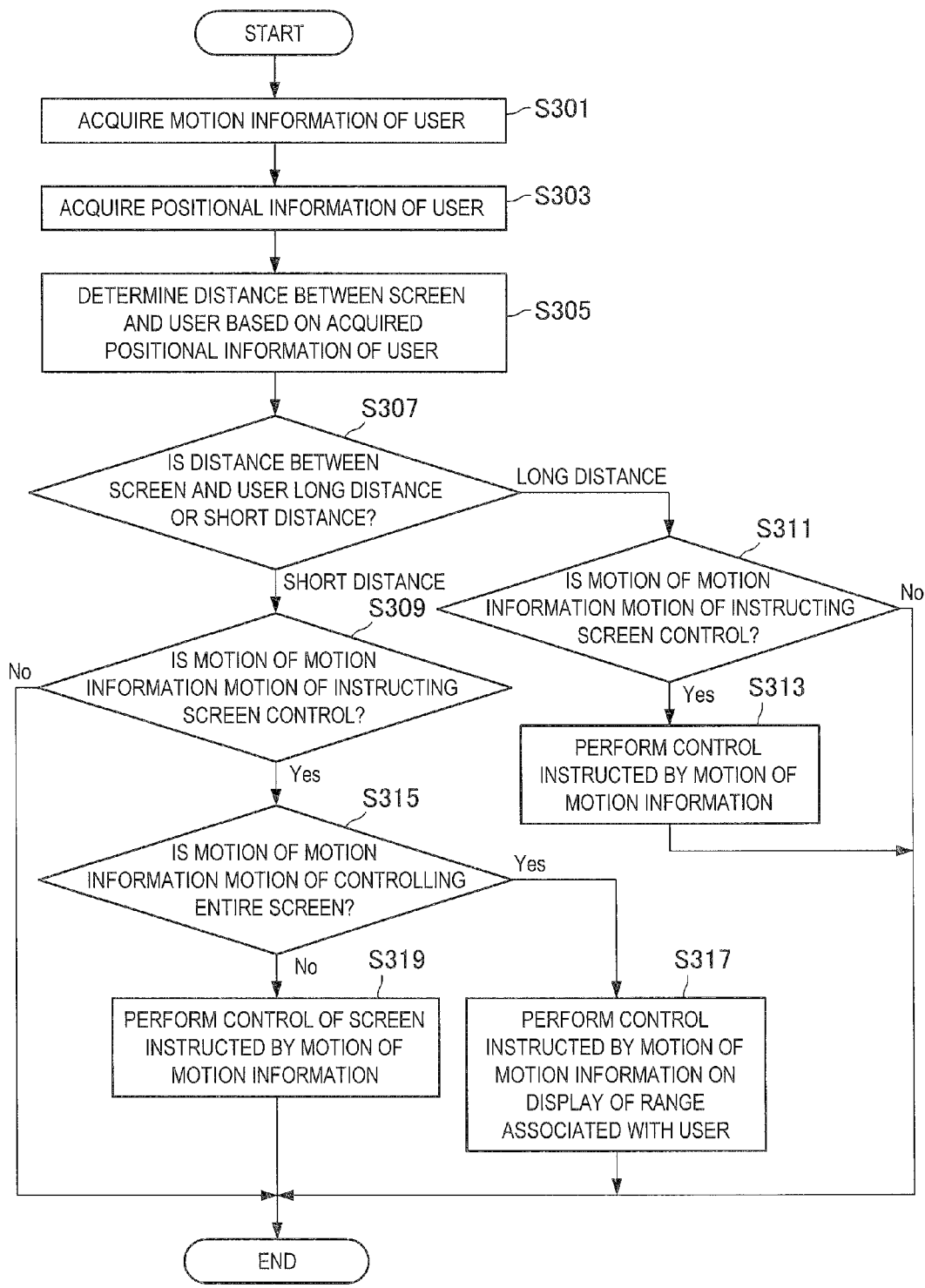
FIG. 16 is a flowchart illustrating the fifth screen control example performed by the display control device according to the first embodiment.

Next, the fifth screen control example performed by the display control device 100 will be described with reference to FIGS. 13 to 16. FIGS. 13 and 14 are explanatory diagrams for describing the fifth screen control example performed by the display control device 100, and FIGS. 15A and 15B are explanatory diagrams for describing the fifth screen control example performed by the display control device 100 when the partial range of the screen is associated with each user. FIG. 16 is a flowchart illustrating the fifth screen control example performed by the display control device 100.

Here, the fifth screen control example is a screen control example in which the screen control unit 109 controls the object displayed on the screen based on the positional information and the motion information of the user acquired by the user information acquiring unit 103.

Specifically, in FIG. 13, the user 7 is viewing objects A, B, C, and D displayed on the display control device 100 at a long distance (for example, a distance of 1 m or larger). Here, when the user 7 performs a motion (for example, a motion of waving a hand(s)) of giving an instruction to change an object, the screen control unit 109 replaces all the objects A, B, C, and D displayed on the display control device 100 with objects E, F, G, and H.

Meanwhile, in FIG. 14, the user 7 is viewing objects A, B, C, and D displayed on the display control device 100 at a short distance (for example, a distance of less than 1 m). Here, similarly to FIG. 13, when the user 7 performs a motion (for example, a motion of waving a hand(s)) of giving an instruction to change an object, the screen control unit 109 replaces only the object A in front of the user 7 with the object E.

In other words, in the fifth screen control example, as illustrated in FIGS. 13 and 14, the screen control unit 109 changes a screen control range corresponding to the motion performed by the user 7 based on the distance between the user 7 and the screen of the display control device 100.

Next, another aspect of the fifth screen control example will be described with reference to FIGS. 15A and 15B. The screen of the display control device 100 of FIG. 15A is not associated with the user 7. However, in the display control device 100 of FIG. 15B, the partial range 17A of the screen is associated with the user 7A, and the partial range 17B of the screen is associated with the user 7B.

Here, in FIG. 15A, when the user 7 performs a motion (for example, a motion of opening a shutter) of giving an instruction to change all the objects, the screen control unit 109 replaces all the displayed objects A, B, and C with the objects E, F, and G Meanwhile, in FIG. 15B, when the user 7A similarly performs a motion (for example, a motion of opening a shutter) of giving an instruction to change all the objects, the screen control unit 109 replaces only the objects A and B included in the partial range 17A of the screen with the objects E and F. Here, the screen control unit 109 does not perform screen control instructed by the user 7A on the object C included in the partial range 17B associated with the user 7B.

In other words, when the partial range of the screen of the display control device 100 is associated with the user, in the fifth screen control example, as illustrated in FIGS. 15A and 15B, the screen control unit 109 performs screen control instructed by the user in only the partial range associated with the user.

Next, the flow of an operation of the display control device 100 in the fifth screen control example will be described with reference to FIG. 16. As illustrated in FIG. 16, first, the user information acquiring unit 103 acquires the motion information of the user 7 detected by the sensor unit 101 (S301). Further, the user information acquiring unit 103 similarly acquires the positional information of the user 7 detected by the sensor unit 101 (S303). Then, the screen control unit 109 determines the distance between the user 7 and the screen of the display control device 100 based on the acquired positional information of the user 7 (S305).

Further, the screen control unit 109 determines whether the distance between the user 7 and the screen of the display control device 100 is the short distance or the long distance (S307). The determination of S307 may be performed using a threshold value. For example, the distance between the user 7 and the screen of the display control device 100 of less than 1 m may be determined to be the short distance, and the distance of 1 m or larger may be determined to be the long distance.

When the distance between the user 7 and the screen of the display control device 100 is the long distance (long distance in S307), the screen control unit 109 determines whether or not the motion included in the motion information of the user 7 is a motion of instructing the screen control (S311). Here, when the motion included in the motion information of the user 7 is not the motion of instructing the screen control (No in S311), the display control device 100 ends the operation. Meanwhile, when the motion included in the motion information of the user 7 is the motion of instructing the screen control (Yes in S311), the screen control unit 109 performs the screen control instructed by the motion included in the motion information of the user 7 (S313).

Further, when the distance between the user 7 and the screen of the display control device 100 is the short distance (short distance in S307), the screen control unit 109 similarly determines whether or not the motion included in the motion information of the user 7 is the motion of instructing the screen control (S309). Here, when the motion included in the motion information of the user 7 is not the motion of instructing the screen control (No in S309), the display control device 100 ends the operation.

Meanwhile, when the motion included in the motion information of the user 7 is the motion of instructing the screen control (Yes in S309), the screen control unit 109 determines whether or not the motion included in the motion information of the user 7 is the motion of controlling the entire screen (S319). Here, when the motion included in the motion information of the user 7 is not the motion of controlling the entire screen (No in S319), the screen control unit 109 performs control according to the motion included in the motion information of the user 7 (S319). Further, when the motion included in the motion information of the user 7 is the motion of controlling the entire screen (No in S319), the screen control unit 109 performs control according to the motion included in the motion information of the user 7 on the partial range associated with the user 7 (S317).

According to the fifth screen control example, the display control device 100 can optimize content and a range of the screen control instructed by the user 7 through a motion based on the distance between the user 7 and the screen of the display control device 100. Thus, the display control device 100 can improve operability for the user 7.

(2.2.6. Sixth Screen Control Example)

Figure 17:
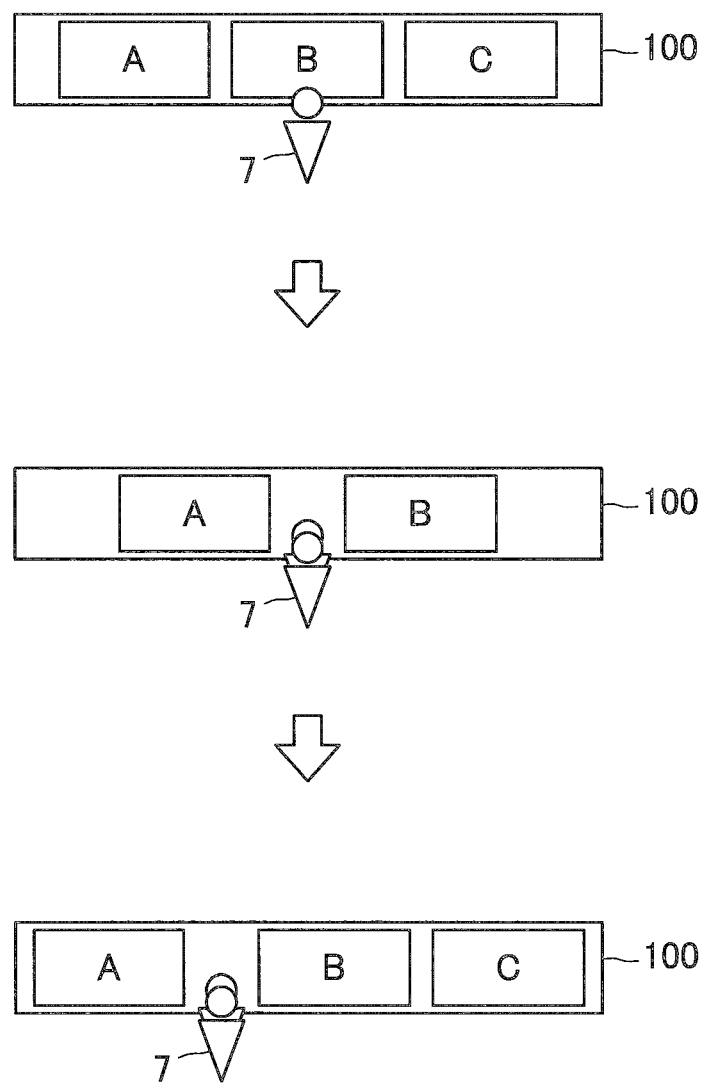
FIG. 17 is an explanatory diagram for describing a sixth screen control example performed by the display control device according to the first embodiment.
Figure 18:
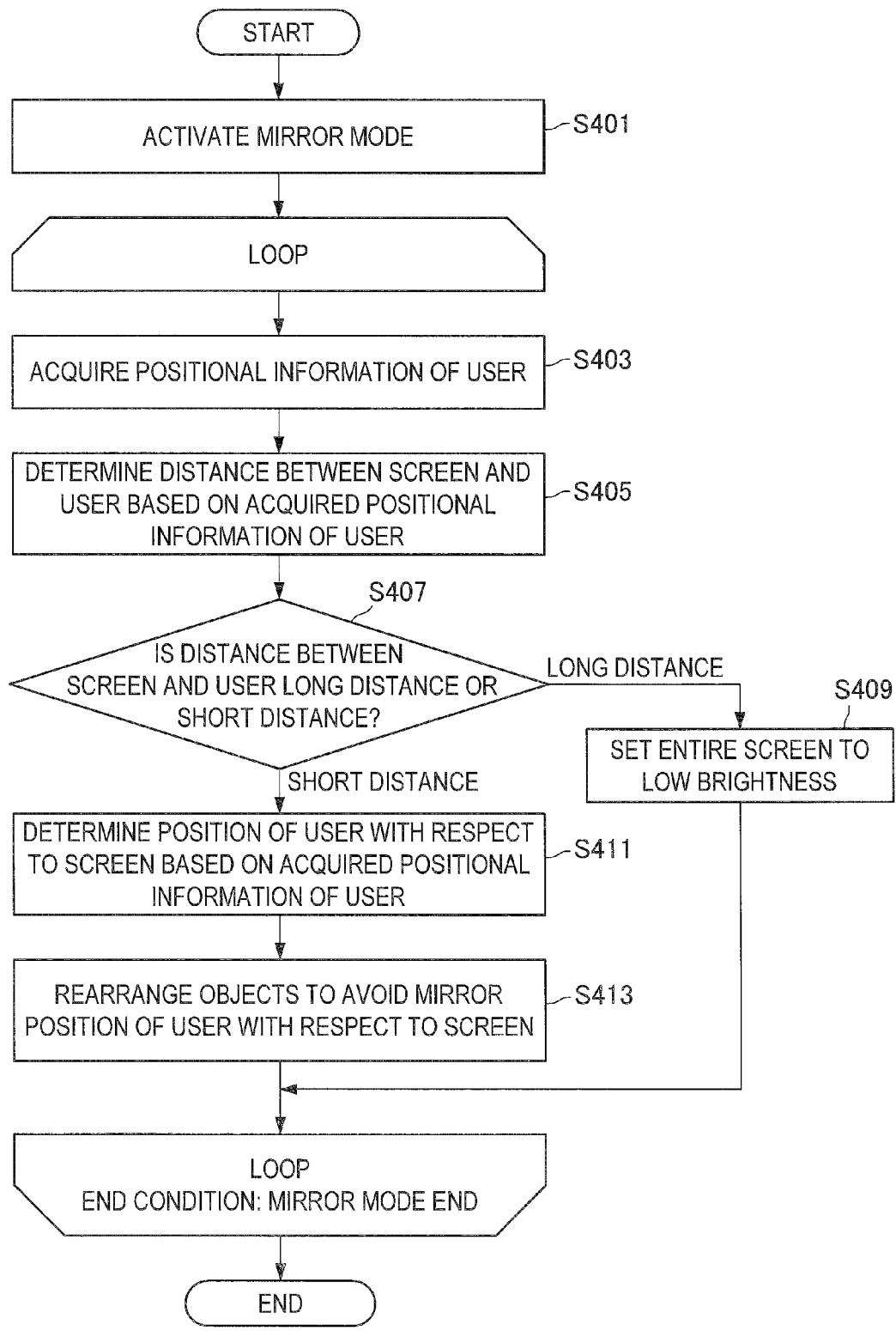
FIG. 18 is a flowchart illustrating the sixth screen control example performed by the display control device according to the first embodiment.

Next, the sixth screen control example performed by the display control device 100 will be described with reference to FIGS. 17 and 18. FIG. 17 is an explanatory diagram for describing the sixth screen control example performed by the display control device 100, and FIG. 18 is a flowchart illustrating the sixth screen control example performed by the display control device 100.

Here, the sixth screen control example is a screen control example in which the screen control unit 109 controls a position and brightness of a displayed object based on the positional information of the user acquired by the user information acquiring unit 103. Through this configuration, the user 7 can use the display control device 100 as a mirror.

Specifically, as illustrated in FIG. 17, the objects A, B, C, and D are displayed on the display control device 100, and the user 7 is viewing the objects displayed on the display control device 100.

Half mirror processing is performed on the surface of the display control device 100. The half mirror processing is processing of giving optical characteristics of transmitting 50% of incident light and reflecting the remaining 50%, and is performed, for example, through a reflective film or a polarizing film arranged on the surface of the display control device 100.

Specifically, a principle of a half mirror is that when a glass or the like that has been subjected to the half mirror processing is arranged between a bright side and a dark side, since part of light is reflected at the bright side, it appears to be the mirror. Meanwhile, since part of light is reflected from the dark side but drowned out by transmitted light from the bright side, the glass appears semi-transparent.

First, as illustrated in an upper portion of FIG. 17, the user 7 gives an instruction of activating the "mirror mode" in front of the display control device 100. For example, the user 7 may give an instruction of activating the mirror mode by uttering "mirror mode," performing a motion, a touch operation on the screen, or the like.

When the "mirror mode" is activated, the screen control unit 109 arranges the object A, B, and C based on the positional information of the user while avoiding the user 7 mirror image position (that is, in front of the user 7) as illustrated in a middle portion of FIG. 17. Further, as illustrated in a lower portion of FIG. 17, when the user 7 moves, the screen control unit 109 rearranges the objects A, B, and C based on the acquired positional information of the user as necessary so that no object is consistently arranged at the user 7 mirror image position.

According to this configuration, no object is arranged at the user 7 mirror image position, the user 7 mirror image position has low brightness, and the half mirror processing is performed on the surface of the display control device 100, and thus the user 7 can use the display control device 100 as the mirror.

Further, for example, when processing of further partially superimposing an image on the user 7 mirror image position is performed, visual effects similar to as if the user 7 were trying on glasses, a hat, or the like can be given.

Next, the flow of an operation of the display control device 100 in the fifth screen control example will be described with reference to FIG. 18. As illustrated in FIG. 18, first, upon receiving the mirror mode activation instruction from the user 7, the display control device 100 activates the mirror mode (S401). Then, the user information acquiring unit 103 acquires the positional information of the user 7 detected by the sensor unit 101 (S403). Then, the screen control unit 109 determines the distance between the user 7 and the screen of the display control device 100 based on the acquired positional information of the user 7 (S405).

Then, the screen control unit 109 determines whether the distance between the user 7 and the screen of the display control device 100 is the short distance or the long distance (S407). The determination of S307 may be performed using a threshold value. For example, the distance between the user 7 and the screen of the display control device 100 of less than 1 m may be determined to be the short distance, and the distance of 1 m or larger may be determined to be the long distance.

When the distance between the user 7 and the screen of the display control device 100 is the long distance (long distance in S407), the screen control unit 109 performs control such that the entire screen has low brightness (S409). Thus, when the distance between the user 7 and the screen of the display control device 100 is the long distance, the display control device 100 operates so that the entire screen can be used as the mirror regardless of an arrangement of objects.

Meanwhile, when the distance between the user 7 and the screen of the display control device 100 is the short distance (short distance in S407), the screen control unit 109 determines the position of the user 7 with respect to the screen of the display control device 100 based on the acquired positional information of the user 7 (S411). The screen control unit 109 rearranges the objects based on the determined position of the user 7 to avoid the user 7 mirror image position (S413). Further, the display control device 100 performs a loop the processes of S403 to S413 until the mirror mode is released so that the user 7 mirror image position consistently functions as the mirror.

According to the sixth screen control example, the user 7 can use the display control device 100 as the mirror. Thus, the display control device 100 can improve convenience for the user 7.

(2.2.7. Seventh Screen Control Example)

Figure 19:
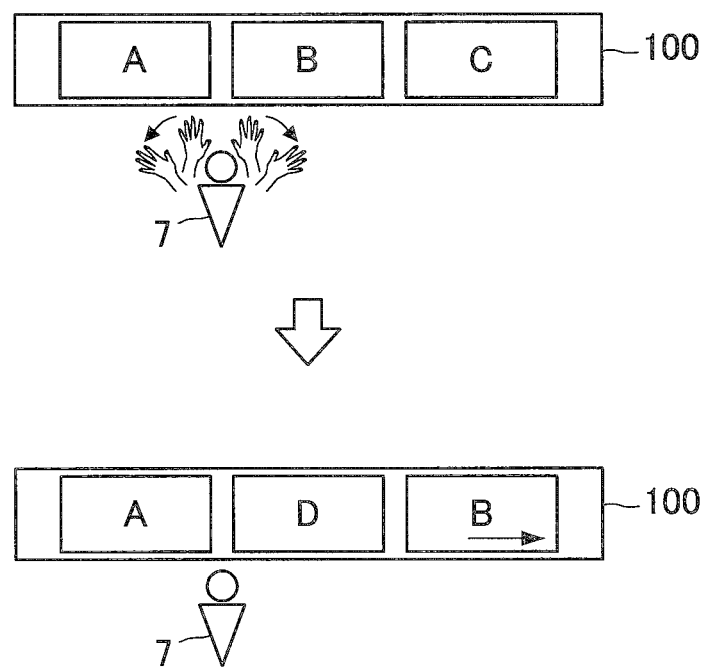
FIG. 19 is an explanatory diagram for describing a seventh screen control example performed by the display control device according to the first embodiment.
Figure 20:
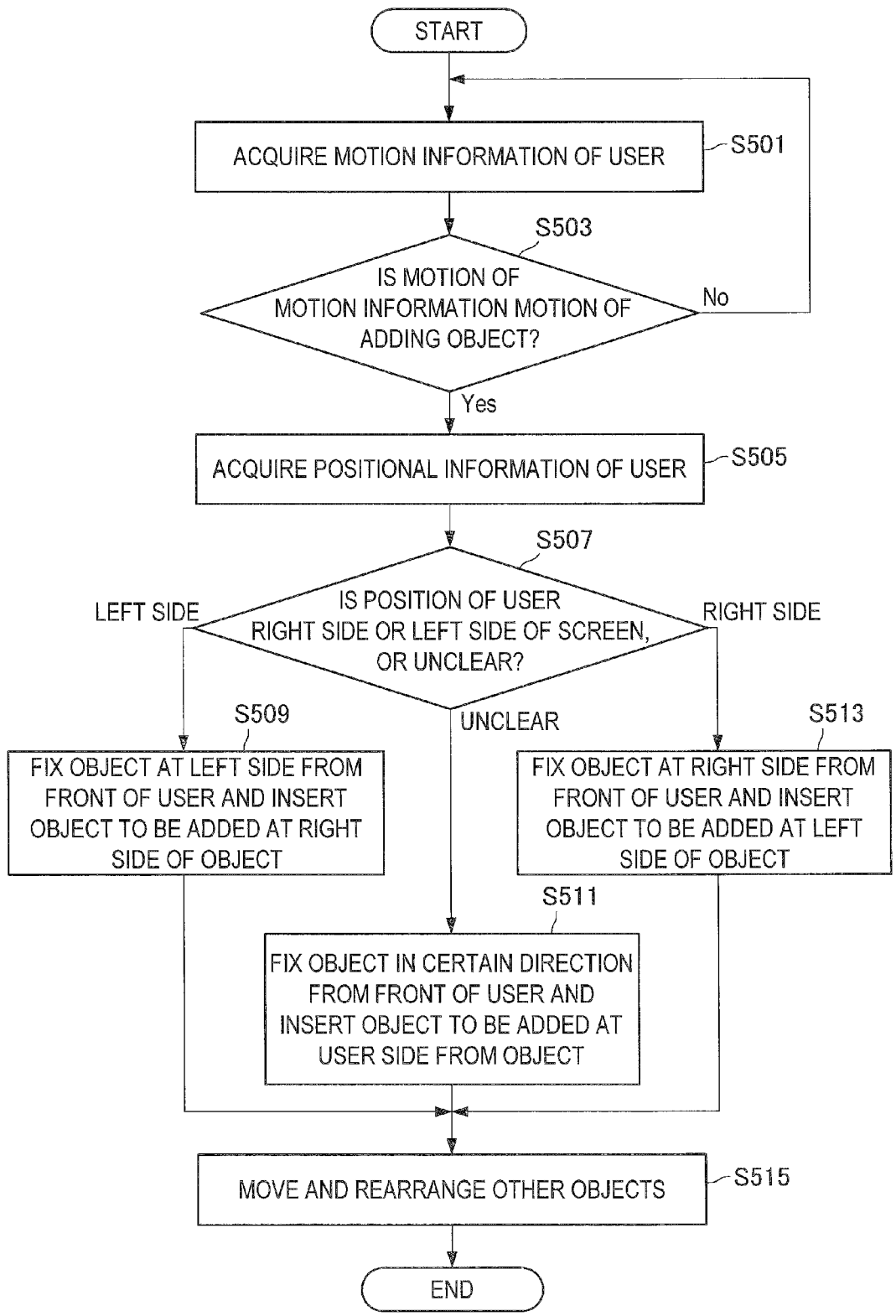
FIG. 20 is a flowchart illustrating the seventh screen control example performed by the display control device according to the first embodiment.

Next, the seventh screen control example performed by the display control device 100 will be described with reference to FIGS. 19 and 20. FIG. 19 is an explanatory diagram for describing the seventh screen control example performed by the display control device 100, and FIG. 20 is a flowchart illustrating the seventh screen control example performed by the display control device 100.

Here, the seventh screen control example is a screen control example in which the screen control unit 109 controls an insertion position of an object to be added based on the positional information of the user acquired by the user information acquiring unit 103.

Specifically, as illustrated in FIG. 19, the objects A, B, and C are displayed on the display control device 100, and the user 7 is positioned between the objects A and B (that is, on the left side of the entire screen) and is viewing the objects displayed on the display control device 100.

As illustrated in an upper portion of FIG. 19, when the user 7 performs a motion (for example, a motion of broadening a space between the object A and B) of giving an instruction to add an object, the screen control unit 109 inserts an additional object D between the objects A and B. More specifically, the screen control unit 109 does not move the object A positioned at the left side from the front of the user 7 but moves the objects B and C positioned at the right side to the right side and inserts the additional object D between the objects A and B.

Further, although not illustrated, when the user 7 is positioned at the right side of the entire screen, the screen control unit 109 does not move the object positioned at the right side from the front of the user 7 but moves the object positioned at the left side and inserts the additional object.

Thus, the screen control unit 109 can determine the objects to be rearranged and the insertion position of the additional object based on the position of the user 7 with respect to the entire screen and control the arrangement of the objects.

Next, the flow of an operation of the display control device 100 in the seventh screen control example will be described with reference to FIG. 20. As illustrated in FIG. 20, first, the user information acquiring unit 103 acquires the motion information of the user 7 detected by the sensor unit 101 (S501). Then, the screen control unit 109 determines whether or not the motion included in the acquired motion information of the user 7 is a motion of giving an instruction to add an object (S503). When the motion included in the motion information of the user 7 is not the motion of giving an instruction to add an object (No in S503), the process returns to S501, and the user information acquiring unit 103 acquires the motion information of the user 7 again.

When the motion included in the motion information of the user 7 is the motion of giving an instruction to add an object (Yes in S503), the user information acquiring unit 103 acquires the positional information of the user 7 detected by the sensor unit 101 (S505). Then, the screen control unit 109 determines whether the position of the user 7 with respect to the screen of the display control device 100 is the left side, the right side, or unclear (for example, when the user 7 is positioned at the center of the screen) based on the acquired positional information of the user 7 (S507).

When the position of the user 7 with respect to the screen of the display control device 100 is the left side (left side in S507), the screen control unit 109 fixes the object at the left side from the front of the user 7, and inserts an object to be added at the right side of the object (S509). Further, when the position of the user 7 with respect to the screen of the display control device 100 is the right side (right side S507), the screen control unit 109 fixes the object on the right side from the front of the user 7, and inserts an object to be added at the left side of the object (S513). Furthermore, when the position of the user 7 with respect to the screen of the display control device 100 is unclear (unclear in S507), the screen control unit 109 fixes an object in a certain direction from the front of the user 7, and inserts an object to be added at the user side with respect to the object (S511). After the object to be added is inserted through the process of S509, S511, or S513, the screen control unit 109 rearranges the other objects (S515).

According to the seventh screen control example, the display control device 100 can insert the object to be added at an optimal position based on the position of the user 7 with respect to the screen of the display control device 100.

(2.2.8. Eighth Screen Control Example)

Figure 21:
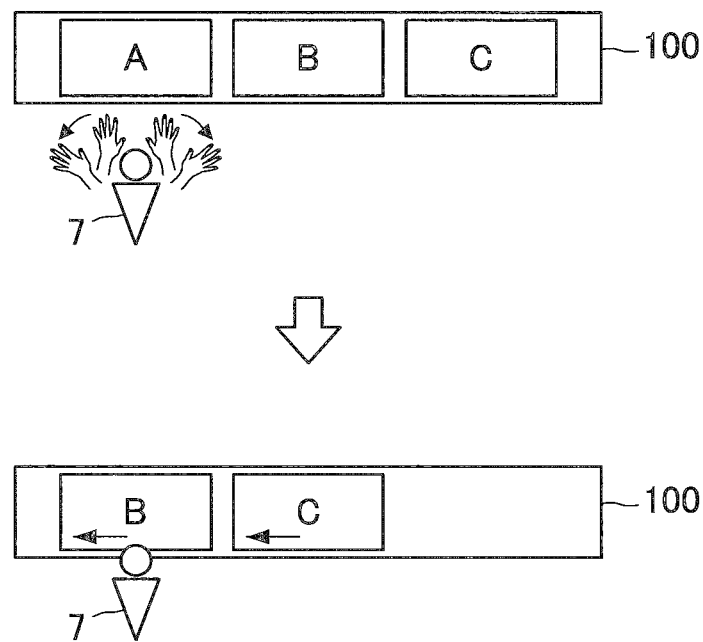
FIG. 21 is an explanatory diagram for describing an eighth screen control example performed by the display control device according to the first embodiment.
Figure 22:
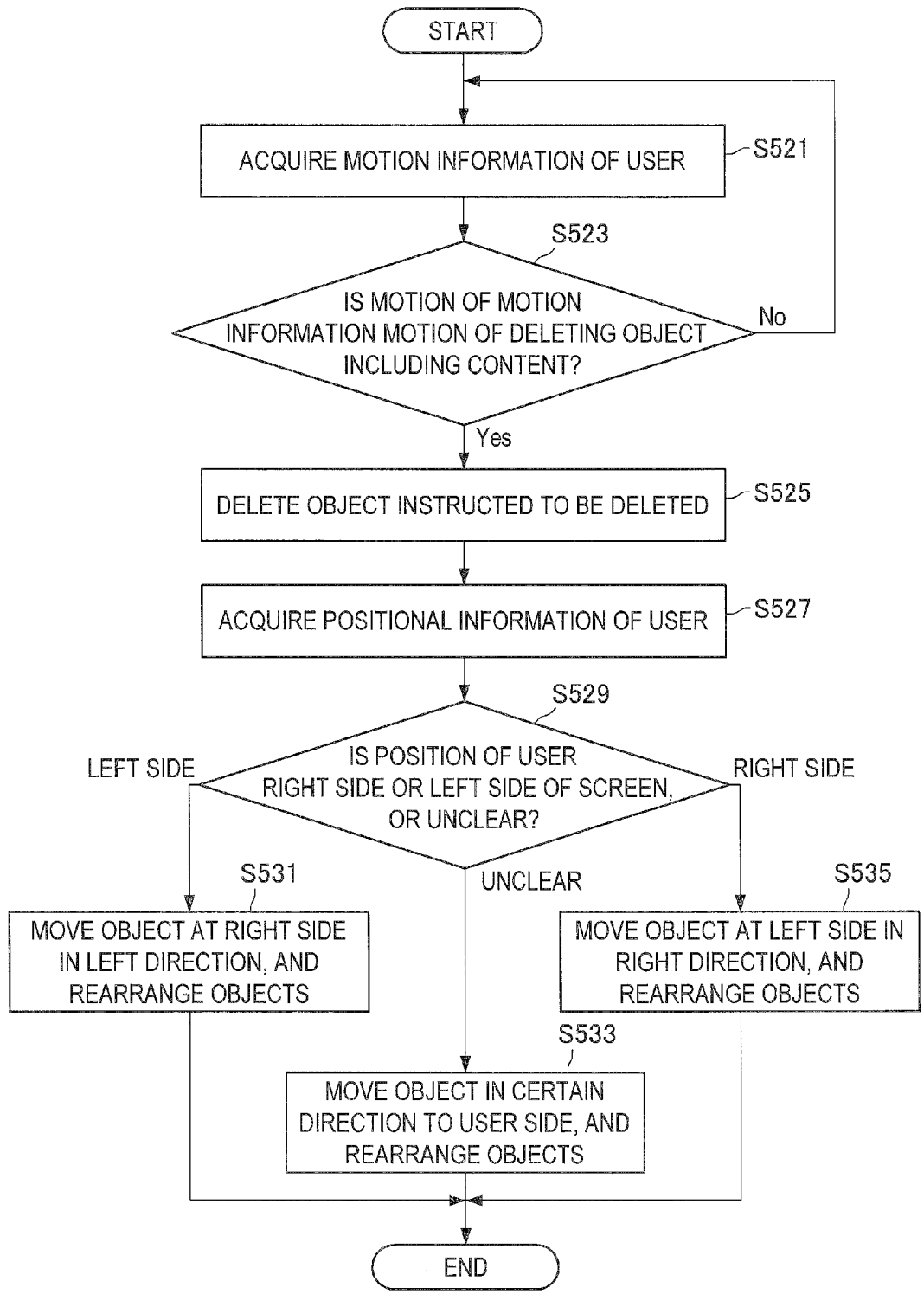
FIG. 22 is a flowchart illustrating the eighth screen control example performed by the display control device according to the first embodiment.

Next, the eighth screen control example performed by the display control device 100 will be described with respect to FIGS. 21 and 22. FIG. 21 is an explanatory diagram for describing the eighth screen control example performed by the display control device 100, and FIG. 22 is a flowchart illustrating the eighth screen control example performed by the display control device 100.

Here, the eighth screen control example is a screen control example in which the screen control unit 109 controls positions of other objects after deleting an object based on the positional information of the user acquired by the user information acquiring unit 103.

Specifically, as illustrated in FIG. 21, the objects A, B, and C are displayed on the display control device 100, and the user 7 is positioned in front of the object A (that is, on the left side of the entire screen), and is viewing the objects displayed on the display control device 100.

As illustrated in an upper portion of FIG. 21, when the user 7 performs a motion (for example, a motion of closing the object A) of giving an instruction to delete the object A, the screen control unit 109 deletes the object A, and rearranges the objects B and C. More specifically, the screen control unit 109 moves the objects B and C positioned at the right side from the front of the user 7 to the left side, and rearranges the objects B and C.

Further, although not illustrated, when the user 7 is positioned at the right side of the entire screen, the screen control unit 109 deletes the object, then moves the object positioned at the left side from the front of the user 7 to the right side, and rearranges the objects.

Thus, the screen control unit 109 can rearrange the other objects without leaving empty space based on the position of the user 7 with respect to the entire screen after deleting the object.

Next, the flow of an operation of the display control device 100 in the eighth screen control example will be described with respect to FIG. 22. As illustrated in FIG. 22, first, the user information acquiring unit 103 acquires the motion information of the user 7 detected by the sensor unit 101 (S521). Then, the screen control unit 109 determines whether or not the motion included in the acquired motion information of the user 7 is a motion of giving an instruction to delete an object (S523). When the motion included in the motion information of the user 7 is not the motion of giving an instruction to delete an object (No in S523), the process returns to S521, and the user information acquiring unit 103 acquires the motion information of the user 7 again.

When the motion included in the motion information of the user 7 is the motion of giving an instruction to delete an object (Yes in S523), the screen control unit 109 deletes an instructed object (S525). Then, the user information acquiring unit 103 acquires the positional information of the user 7 detected by the sensor unit 101 (S527). Then, the screen control unit 109 determines whether the position of the user 7 with respect to the screen of the display control device 100 is the left side, the right side, or unclear (for example, when the user 7 is positioned at the center of the screen) based on the acquired positional information of the user 7 (S529).

When the position of the user 7 with respect to the screen of the display control device 100 is the left side (left side in S529), the screen control unit 109 moves the object at the right side from the front of the user 7 to the left side, and rearranges of the objects (S531). Further, when the position of the user 7 with respect to the screen of the display control device 100 is the right side (right side in S529), the screen control unit 109 moves the object at the left side from the front of the user 7 to the right side, and rearranges of the objects (S535). Furthermore, when the position of the user 7 with respect to the screen of the display control device 100 is unclear (unclear in S529), the screen control unit 109 moves an object in a certain direction from the front of the user 7 to the user side, and rearranges the objects (S533).

According to the eighth screen control example, the display control device 100 can rearrange the other object at an optimal position based on the position of the user 7 with respect to the screen of the display control device 100 after deleting the object.

3. Second Embodiment

Next, a display control system according to the second embodiment of the present disclosure will be described with reference to FIGS. 23 to 28B. First, an overview of the display control system according to the second embodiment of the present disclosure including the background will be described.

The display control system according to the second embodiment of the present disclosure is an information processing system that includes a plurality of display units, acquires a positional relation of the plurality of display units, integrally generates screens displayed on the plurality of display units, and performs control. Specifically, the display control system according to the second embodiment of the present disclosure is a display control system including the display device illustrated in FIGS. 1A to 1C.

Here, in the display device (for example, a screen size is 20 inches or less) such as the tablet terminal disclosed in JP 2009-251303A, it is not assumed that a plurality of display units are integrally controlled. Further, when a plurality of display units are connected to one display control device, it is possible to simultaneously control a plurality of connected display units, but it is difficult to control a plurality of display units based on a relation thereof. For example, it is difficult to control screens displayed on a plurality of display units arranged at arbitrary positions based on the arrangement positions.

In light of the above background, the inventor(s) of the present application developed the display control system according to the second embodiment of the present disclosure. The display control system according to the second embodiment of the present disclosure can acquire a mutual positional relation of a plurality of display units, generate a screen in which screens displayed on a plurality of display units are associated with one another based on the acquired positional relation, and control the screen. Thus, the display control system according to the second embodiment of the present disclosure can integrally generate and control the screens displayed on the display units arranged at arbitrary positions.

[3.1. Configuration of Display Control System]

Figure 23:
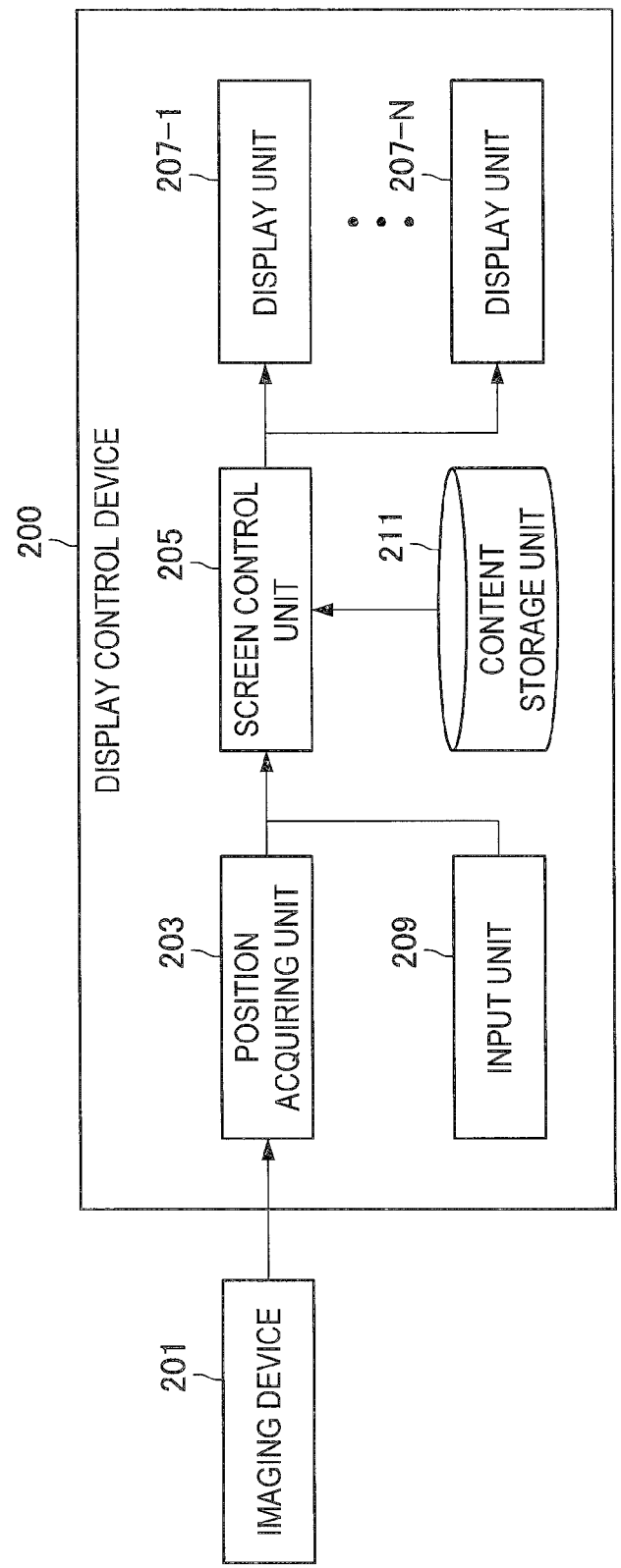
FIG. 23 is a block diagram illustrating an internal configuration of a display control system according to a second embodiment of the present disclosure.

Next, a configuration of the display control system according to the second embodiment of the present disclosure will be described with reference to FIG. 23. FIG. 23 is a block diagram illustrating an internal configuration of the display control system according to the second embodiment of the present disclosure.

As illustrated in FIG. 23, the display control system according to the second embodiment of the present disclosure includes a display control device 200 including a position acquiring unit 203, a screen control unit 205, an input unit 209, a content storage unit 211, display units 207-1 to 207-N and an imaging device 201. The content storage unit 211 is substantially the same as the content storage unit 105 described in the first embodiment, and a description thereof will be omitted here.

Here, the display units 207-1 to 207-N may be display devices equipped outside the display control device 200. In this case, the display units 207-1 to 207-N are connected with the display control device 200 directly or via a network, and perform functions through communication. The imaging device 201 may be equipped in the display control device 200.

The imaging device 201 photographs an image including the display units 207-1 to 207-N. Specifically, the imaging device 201 photographs the display units 207-1 to 207-N as a single image or a single moving image by turning the imaging device 201 from a fixed position. For example, the imaging device 201 is a camera, a video camera, or the like.

The position acquiring unit 203 analyzes the image photographed by the imaging device 201, and acquires the positional relation of the display units 207-1 to 207-N. Specifically, the position acquiring unit 203 recognizes the display units 207-1 to 207-N shown in the image from the image photographed by the imaging device 201, and calculates, for example, a direction or a size of the display units 207-1 to 207-N or a distance from the imaging device 201. The position acquiring unit 203 calculates and acquires the mutual positional relation of the display units 207-1 to 207-N based on, for example, the acquired direction or size of the display units 207-1 to 207-N or the distance from the imaging device 201.

The screen control unit 205 generates screens to be displayed on the display units 207-1 to 207-N based on the positional relation of the display units 207-1 to 207-N received from the position acquiring unit 203, and controls the generated screen. Specifically, the screen control unit 205 acquires various kinds of content from the content storage unit 211, and generates an object including the various kinds of acquired content. The screen control unit 205 further generates a screen including the object including the various kinds of content based on the positional relation of the display units 207-1 to 207-N received from the position acquiring unit 203. More specifically, the screen generation of the screen control unit 205 is divided into a first screen generation example and a second screen generation example.

First, the first screen generation example of the screen control unit 205 will be described. The screen control unit 205 generates a virtual screen including the display units 207-1 to 207-N and non-displayed regions between neighboring display units of the display units 207-1 to 207-N based on the positional relation of the display units 207-1 to 207-N. In other words, screens to be displayed on the display units 207-1 to 207-N are generated as a part of the virtual screen.

Specifically, the screen control unit 205 generates a screen even for the non-displayed regions between neighboring display units of the display units 207-1 to 207-N, and generates a virtual screen displayed on a single virtual display unit including regions displayed on the display units 207-1 to 207-N and the non-displayed regions between neighboring display units of the display units 207-1 to 207-N. Further, the screen control unit 205 cuts regions corresponding to the display units 207-1 to 207-N from the virtual screen, and generates the cut regions as the screens displayed by the display units 207-1 to 207-N.

For this reason, in this screen generation example, from a point of view of the user, the screens displayed on the display units 207-1 to 207-N look like opened windows with respect to the virtual display unit, and a space between the neighboring display units of the display units 207-1 to 207-N looks like a wall hiding the virtual display unit.

Next, the second screen generation example of the screen control unit 205 will be described. The screen control unit 205 generates the screens displayed on the display units 207-1 to 207-N as one consecutive screen based on the positional relation of the display units 207-1 to 207-N. For example, the screen control unit 205 may generate a screen displayed on a second display unit positioned below a first display unit to be consecutive below a screen displayed on the first display unit. Further, the screen control unit 205 may generate a screen displayed on a third display unit positioned at the right of the first display unit to be consecutive to the right of the screen displayed on the first display unit.

The display units 207-1 to 207-N displays the screens generated by the screen control unit 205. For example, the display units 207-1 to 207-N may be display devices such as an LCD device, an OLED display device, a plasma display device, or a CRT display device. Further, the display units 207-1 to 207-N may be touch panel devices integrated with the input unit 209.

The input unit 209 includes an input device capable of performing an input on a plurality of display units 207-1 to 207-N, a control circuit, and the like. Specifically, the input unit 209 is a camera capable of recognizing an instruction given by the user 7 through a motion, a laser pointer mouse capable of using a laser pointer as a mouse pointer, a touch panel capable of recognizing a touch operation performed by the user, or the like.

[3.2. Control Examples of Display Control System]

Then, screen control examples (first to third screen control examples) performed by the display control system according to the second embodiment of the present disclosure will be described with reference to FIGS. 24A to 28B.

(3.2.1. First Screen Control Example)

Figure 24A:
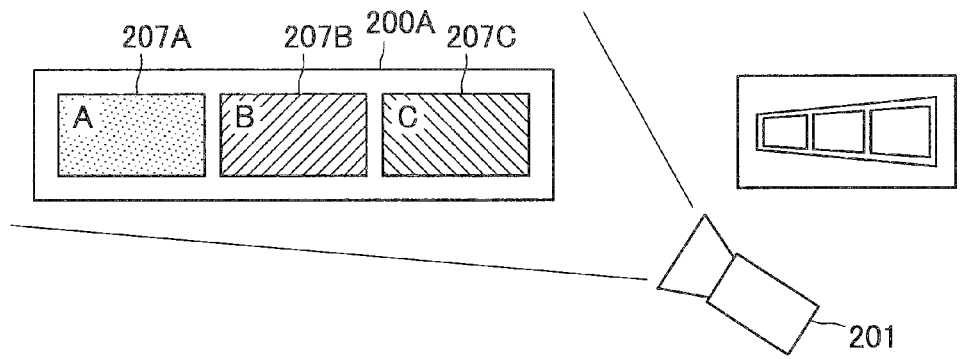
FIG. 24A is an explanatory diagram for describing a first screen control example performed by the display control system according to the second embodiment.
Figure 24B:
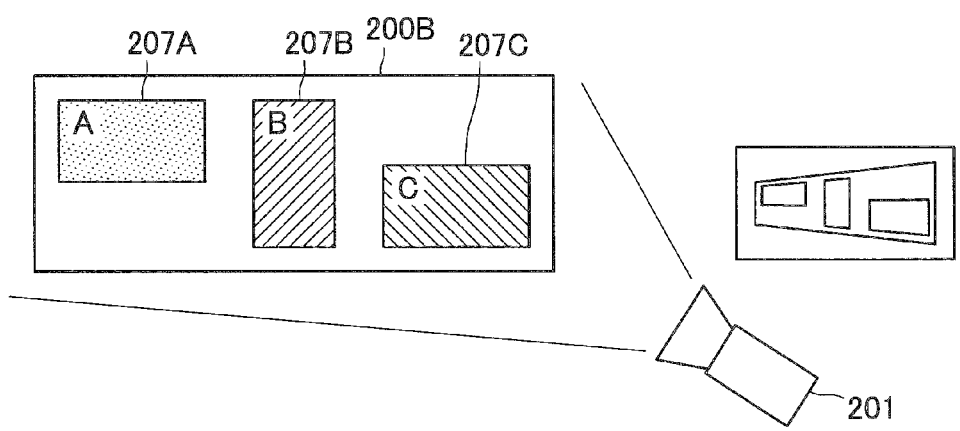
FIG. 24B is an explanatory diagram for describing a first screen control example performed by the display control system according to the second embodiment.
Figure 24C:
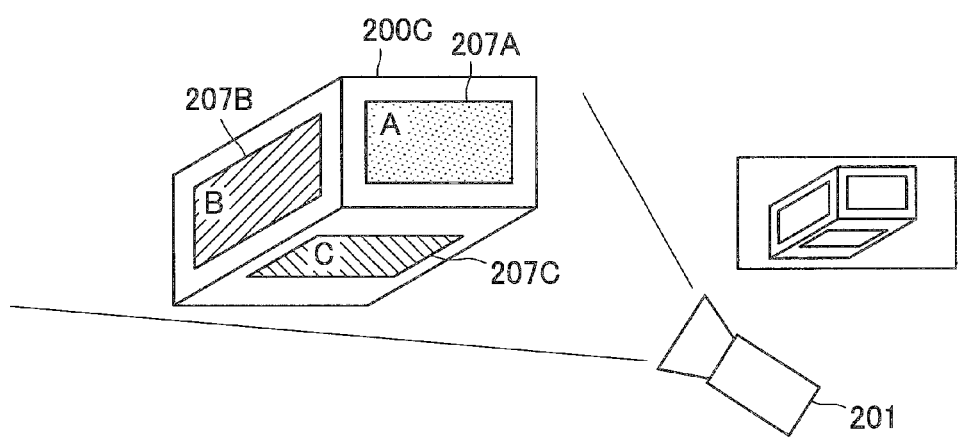
FIG. 24C is an explanatory diagram for describing a first screen control example performed by the display control system according to the second embodiment.

First, the first screen control example performed by the display control system will be described with reference to FIGS. 24A to 25. FIGS. 24A to 24C are explanatory diagrams for describing the first screen control example performed by the display control system, and FIG. 25 is a sequence diagram illustrating the first screen control example performed by the display control system.

Here, the first screen control example is a screen control example in which the position acquiring unit 203 acquires the positional relation of the plurality of display units 207 based on the photographed image, and the screen control unit 205 generates screens displayed on the plurality of display units 207 based on the positional relation of the plurality of display units 207.

Specifically, as illustrated in FIG. 24A, the display control device 200A is equipped with display units 207A, 207B, and 207C. The display units 207A, 207B, and 207C are photographed as a single image by the imaging device 201 or a single moving image by turning the imaging device 201 from a fixed position.

Further, each of the display units 207A, 207B, and 207C displays a special pattern including a pattern of a certain size. Here, the position acquiring unit 203 can calculate a positional relation of each of the display units 207A, 207B, and 207C by associating a position, a direction, and a size of a special pattern in a photographed image with a size and a shape of an actual special pattern. For example, a special pattern including a pattern of a certain size is 1 cm square of a houndstooth pattern.

Further, the position recognition of the display units 207A, 207B, and 207C by the position acquiring unit 203 may be performed by a simultaneous localization and mapping (SLAM) technique.

Thus, the screen control unit 205 can generate the screens displayed on the display units 207A, 207B, and 207C based on the positional relation of the display units 207A, 207B, and 207C acquired by the position acquiring unit 203.

Further, in the first screen control example, the screen generated by the screen control unit 205 may be the screen described in the first screen generation example in [3.1. Configuration of display control system].

In other words, the screen generated by the screen control unit 205 is preferably a single virtual screen including the regions of the display units 207A, 207B, and 207C and the non-displayed regions between the neighboring display units of the display units 207A, 207B, and 207C. In this case, only the screens of the regions corresponding to the display units 207A, 207B, and 207C in the single virtual screen are displayed on the display units 207A, 207B, and 207C.

The arrangement of the display units 207A, 207B, and 207C equipped in the display control device 200 is not limited to an arrangement of an equal interval in the transverse direction which is illustrated in FIG. 24A. For example, as illustrated in FIG. 24B, the display control device 200B may include the display units 207A, 207B, and 207C arranged at an arbitrary position and in an arbitrary direction on the same plane. Further, as illustrated in FIG. 24C, the display control device 200C may include the display units 207A, 207B, and 207C arranged in an arbitrary position (for example, a ceiling, a floor, a wall, or the like) in the same space.

Next, the flow of an operation of the display control system in the first screen control example will be described with reference to FIG. 25.

As illustrated in FIG. 25, first, a certain special pattern screen is transmitted from the display control device 200 to the display unit 207 (S601). Next, the display unit 207 displays the received certain special pattern screen (S603). Here, the imaging device 201 photographs an image including all the display units 207 displaying the certain special pattern screen (S605), and transmits the photographed image to the display control device 200 (S607).

The display control device 200 calculates the positional relation of the display unit 207 based on the image received by the position acquiring unit 203 (S609), and the screen control unit 205 generates the screen to be displayed on the display unit 207 based on the calculated positional relation of the display unit 207 (S611). Further, the display control device 200 transmits the generated screen to the display unit 207 (S613), and the display unit 207 displays the received screen (S615).

According to the first screen control example, the display control system can acquire the positional relation of the display unit 207 arranged at an arbitrary position and generate the screen to be displayed on the display unit 207 based on the acquired positional relation of the display unit 207. Thus, the display control system can control a plurality of display units 207 arranged at arbitrary positions like a part of the screen including the regions displayed by the plurality of display units 207.

(3.2.2. Second Screen Control Example)

Figure 26A:
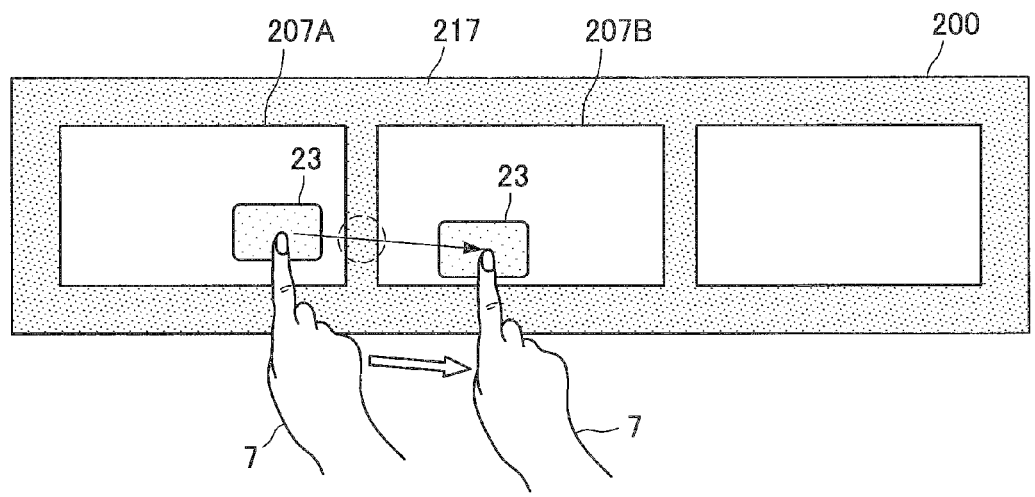
FIG. 26A is an explanatory diagram for describing a second screen control example performed by the display control system according to the second embodiment.
Figure 26B:
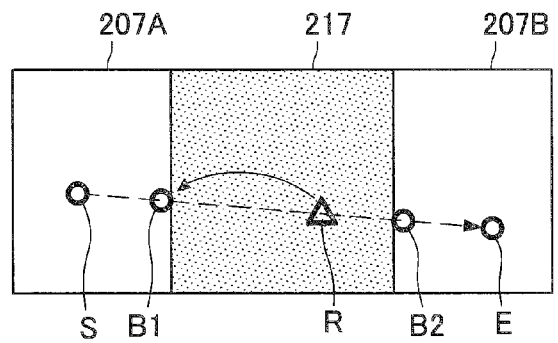
FIG. 26B is an enlarged diagram of a portion indicated by a dotted line in FIG. 26A.

Then, the second screen control example performed by the display control system will be described with reference to FIGS. 26A and 26B. FIG. 26A is an explanatory diagram for describing the second screen control example performed by the display control system, and FIG. 26B is an enlarged diagram of a portion indicated by a dotted line in FIG. 26A.

Here, the second screen control example is a screen control example in which a position of an object is controlled when an object is moved between neighboring display units of a plurality of display units 207. For example, display units 207A, 207B, and 207C and an edge frame portion 217 are a touch panel in which an input operation can be performed by a touch operation.

For example, a first aspect of the second screen control example is a control example described as the first screen generation example in [3.1. Configuration of the display control system].

For example, as described above in the first screen generation example in [3.1. Configuration of the display control system], when the screen is generated for the non-displayed region between the display units 207A and 207B, the screen is not displayed, but from a point of view of data, the screen is arranged even on the edge frame portion 217. Thus, the user 7 can move an object 23 onto the edge frame portion 217 by a touch operation, similarly to the display units 207A and 207B.

Here, when the user 7 releases the touch operation for the object 23 in the edge frame portion 217, since the object 23 is arranged on the non-displayed edge frame portion 217, it is difficult for the user 7 to visually recognize the object 23 and perform an operation. In this regard, in the first aspect of the second screen control example, control for preventing a situation in which the object 23 is arranged on the edge frame portion 217 and thus it is difficult to perform an operation is performed.

Specifically, in FIG. 26B, the object 23 departs from a starting point S in the display unit 207A, passes through a boundary point B1 between the display unit 207A and the edge frame portion 217 and a boundary point B2 between the edge frame portion 217 and the display unit 207B, and then moves to an ending point E in the display unit 207B.

Here, when the object 23 moves from the starting point S and then passes through the boundary point B1 between the display unit 207A and the edge frame portion 217, the screen control unit 205 acquires a coordinate position of the boundary point B1. Further, when the touch operation for the object 23 is released at a release point R included in the edge frame portion 217, the screen control unit 205 arranges the object 23 at the boundary point B1 whose coordinate position has been acquired. Meanwhile, when the object 23 passes through the boundary point B2 between the edge frame portion 217 and the display unit 207B and enters the display unit 207B, the screen control unit 205 arranges the object 23 at the position at which the touch operation is released. The object 23 moves while following the touch operation position from the starting point S to the ending point E.

As this control is performed, even when the user 7 releases the touch operation for the object 23 on the edge frame portion 217, the screen control unit 205 can prevent a situation in which the object 23 is arranged on the non-displayed edge frame portion 217 and thus it is difficult to perform an operation.

For example, a second aspect of the second screen control example is a control example described as the second screen generation example in [3.1. Configuration of the display control system].

For example, as described above in the second screen generation example in [3.1. Configuration of the display control system], when the display units 207A and 207B are generated as one consecutive screen, there is no screen on the edge frame portion 217. Thus, when the user 7 tries to move the object 23 from the display unit 207A to the display unit 207B by the touch operation, if the touch operation enters the edge frame portion 217 from the display unit 207A, the touch operation is determined to be performed outside the screen, and the touch operation is released. In this regard, in the second aspect of the second screen control example, in this case, control is performed such that the touch operation for the object 23 continues.

Specifically, in FIG. 26B, the object 23 departs from a starting point S in the display unit 207A, passes through a boundary point B1 between the display unit 207A and the edge frame portion 217 and a boundary point B2 between the edge frame portion 217 and the display unit 207B, and then moves to an ending point E in the display unit 207B.

Here, when the object 23 moves from the starting point S and then passes through the boundary point B1 between the display unit 207A and the edge frame portion 217, the screen control unit 205 acquires a coordinate position of the boundary point B1. Further, while the touch operation is being performed between the boundary point B1 and the boundary point B2 (that is, the edge frame portion 217), the screen control unit 205 determines that the touch operation for the object 23 continues. Further, while the touch operation is being performed between the boundary point B1 and the boundary point B2, the object 23 may be arranged on the boundary point B1.

Further, when the touch operation for the object 23 is released at the release point R included in the edge frame portion 217, the screen control unit 205 rearranges the object 23 at the boundary point B1 whose coordinate position has been acquired. Meanwhile, after the touch operation passes through the boundary point B2 and then enters the display unit 207B, the screen control unit 205 moves the object 23 to the touch operation position in the display unit 207B. Thus, after entering the display unit 207B, the object 23 moves while following the touch operation, and the object 23 is arranged at the position at which the touch operation is released.

According to this control, the screen control unit 205 makes it possible for the user 7 to move the object 23 beyond the edge frame portion 217. Further, even when the user 7 releases the touch operation for the object 23 on the edge frame portion 217, the object 23 can be rearranged in the display unit 207A.

According to the second screen control example, the display control system can smoothly move an object between neighboring display units of a plurality of display units.

The description has proceeded in connection with a movement of an object by the touch operation using the touch panel, but the second screen control example is not limited to this example. For example, the second screen control example can be similarly applied, for example, even when an object is moved between the display units through an operation performed by the user 7 through a motion or even when an object is moved between the display units through an operation performed using a laser pointer.

(3.2.3. Third Screen Control Example)

Next, the third screen control example performed by the display control system will be described with reference to FIGS. 27, 28A, and 28B. FIGS. 27A to 27C are explanatory diagrams for describing the third screen control example performed by the display control system, and FIGS. 28A and 28B are explanatory diagrams illustrating other exemplary screens in the third screen control example.

Here, the third screen control example is a screen control example in which, for example, in order to cause the region (for example, the edge frame portion 217) in which the screen is not displayed in a plurality of display units to be inconspicuous, the screen control unit 205 generates a screen including a display frame corresponding to the edge frame portion 217.

Figure 27A:
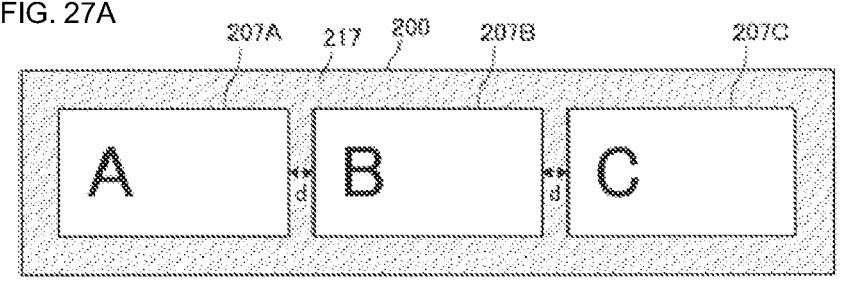
FIGS. 27A, 27B, and 27C are explanatory diagrams for describing a third screen control example performed by the display control device according to the second embodiment.

Specifically, as illustrated in FIG. 27A, in the display control device 200, the display units 207A, 207B, and 207C are consecutively arranged at equal intervals d in a row in the transverse direction. In this case, the screen control unit 205 generates a display screen 25 illustrated in FIG. 27B.

Figure 27B:
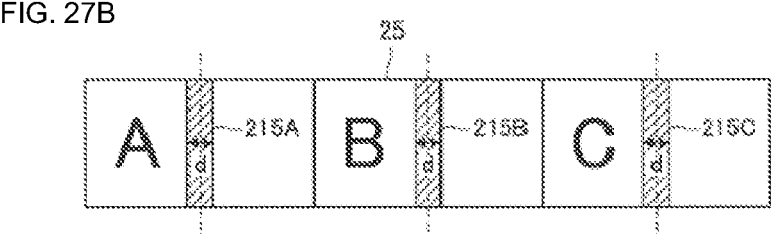
Figure 28A:
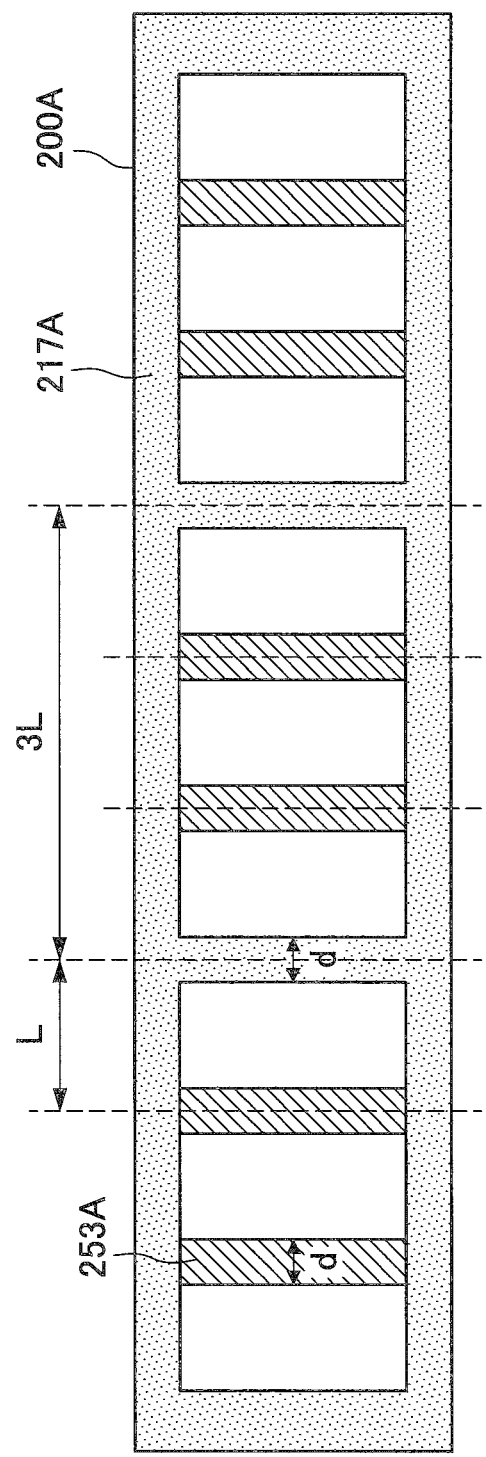
FIG. 28A is an explanatory diagram illustrating another exemplary screen in the third screen control example performed by the display control system according to the second embodiment.

Specifically, the screen control unit 205 generates the display screen 25 in which display frames 251A, 251B, and 251C having a width d are arranged at the centers of the screens displayed on the display units 207A, 207B, and 207C as illustrated in FIG. 27B. The display screen 25 illustrated in FIG. 27B is generated based on the screen generation example (the second screen generation example in [3.1. Configuration of the display control system]) when the display units 207A, 207B, and 207C display the consecutive screens.

Figure 27C:
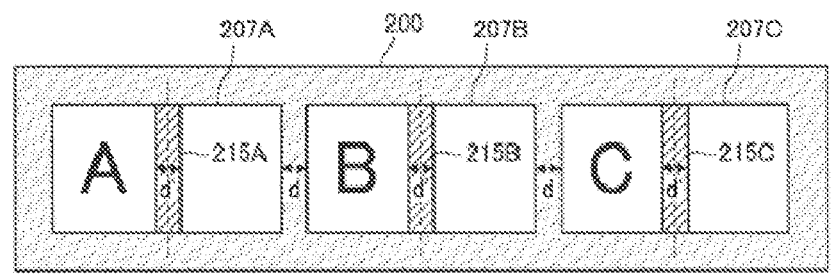

Here, a result of displaying the display screen 25 illustrated in FIG. 27B in the display control device 200 illustrated in FIG. 27A is illustrated in FIG. 27C. As illustrated in FIG. 27C, the screens displayed on the display units 207A, 207B, and 207C are divided into two by the display frames 251A, 251B, and 251C with the width d and can appear to be divided into six together with the edge frame portion 217. Thus, as the screen control unit 205 divides the screens displayed on the display units 207A, 207B, and 207C into two with the width d, it is possible to cause the display control device 200 to appear to be divided into 6 by the display frame of the width d.

For example, the intervals d between the neighboring display units of the display units 207A, 207B, and 207C can be calculated when the position acquiring unit 203 acquires the positional relation of the display units 207A, 207B, and 207C. Further, the intervals between the neighboring display units of the display units 207A, 207B, and 207C may be measured in advance and individually set.

Another exemplary screen in the third screen control example will be described with reference to FIGS. 28A and 28B.

As illustrated in FIG. 28A, in a display control device 200A in which display units are consecutively arranged in a row in the transverse direction, when the width of the edge frame portion 217A is d, the screen control unit 205 may generate a screen divided into three by the display frame 253 of the width d and display the generated screen on the display units. In this case, it is possible to cause the display units to appear to be divided into nine in the transverse direction in the entire display control device 200A. Further, the screen control unit 205 may generate a screen divided into (X+1) by arranging an arbitrary number X of display frames 253 and cause the screen to appear to be divided into 3(X+1) in the entire display control device 200A.

Further, as illustrated in FIG. 28B, in a display control device 200B in which display units are arranged in a matrix form, when the width of the edge frame portion 217B is d, the screen control unit 205 may generate a screen that is divided into two vertically and horizontally by the display frame 253B with the width d and thus divided into four in total and cause the generated screen to be displayed on the display units. In this case, it is possible to cause the display units to appear to be divided into six in the transverse direction and four in the vertical direction in the entire display control device 200B.

According to the third screen control example, it is possible to arrange the display frame on the screen generated by the screen control unit 205 based on the width of the region (for example, the edge frame portion 217) on which the screen is not displayed between neighboring display units of a plurality of display units. According to this configuration, the screen control unit 205 can generate and display a more natural screen without causing the edge frame portion 217 to be noticeable.

4. Hardware Configuration of Display Control Device According to Embodiment of Present Disclosure Next, a hardware configuration of a display control device 300 according to an embodiment of the present disclosure will be described with reference to FIG. 29. FIG. 29 is an explanatory diagram for describing a hardware configuration of the display control device 300 according to an embodiment of the present disclosure. Information processing performed by the display control device 300 is implemented by collaboration of software and hardware.

As illustrated in FIG. 29, the display control device 300 includes a central processing unit (CPU) 301, a read only memory (ROM) 303, a random access memory (RAM) 305, a bridge 309, internal buses 307 and 311, an interface 313, an input device 315, an output device 317, a storage device 319, a drive 321, a connection port 323, and a communication device 325.

The CPU 301 functions as an arithmetic processing device and a control device, and controls an overall operation of the display control device 300 according to various kinds of programs. The ROM 303 stores a program, operation parameters, and the like used by the CPU 301, and the RAM 305 temporarily stores a program used in execution of the CPU 301, a parameter that appropriately changes in the execution, and the like. The CPU 301 executes, for example, the functions of the user information acquiring unit 103, the position acquiring unit 203, and the screen control units 109 and 205.

The CPU 301, the ROM 303, and the RAM 305 are connected to one another through the bridge 309, the internal buses 307 and 309, and the like. Further, the CPU 301, the ROM 303, and the RAM 305 are also connected with the input device 315, the output device 317, the storage device 319, the drive 321, the connection port 323, and the communication device 325 through the interface 313.

The input device 315 includes a device used when the user inputs information such as a touch panel, a device that receives information from the outside such as a sensor, and an input control circuit that generates an input signal based on input information and outputs the input signal to the CPU 301. The input device 315 executes, for example, the functions of the sensor unit 101 and the input unit 209.

For example, the output device 317 includes a display device such as an LCD device, an OLED device, a plasma display device, a CRT device, or a lamp. The output device 317 may further include an audio output device such as a speaker or a headphone. For example, the display device displays a generated image. Meanwhile, the audio output device converts audio data or the like into sound, and outputs the sound. The output device 317 executes, for example, the functions of the display units 111-1 to 111-N and 207-1 to 207-N.

The storage device 319 is a data storage device configured as an example of a storage unit of the display control device 300. The storage device 319 may include a storage medium, a storing device that stores data in the storage medium, a reading device that reads data from the storage medium, and a deleting device that deletes stored data. The storage device 319 executes, for example, the functions of the content storage units 105 and 211.

The drive 321 is a reader/writer for a storage medium, and is embedded in the display control device 300 or attached externally thereto. The drive 321 reads information recorded in a removable storage medium attached thereto such as a magnetic disk, an optical disc, a magneto-optical disc, or a semiconductor memory, and outputs the read information to the RAM 305. Further, the drive 321 can write information in a removable storage medium.

For example, the connection port 323 is a connection interface configured with a connection port used to connect an external connecting device such as a Universal Serial Bus (USB) port or an optical audio terminal.

For example, the communication device 325 is a communication interface configured with a communication device that is connected to the public network 5. Further, the communication device 325 may be a wireless LAN supporting communication device or a cable communication device that performs wired cable communication. The communication device 325 executes, for example, the function of the communication unit 107.

Further, it is possible to create a computer program causing hardware such as the CPU, the ROM, and RAM equipped in the display control device 300 to perform functions equivalent to the respective components of the display control device 300. Further, a storage medium storing the computer program is also provided.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Further, the effects described in this specification are merely explanatory or exemplary and not limited. In other words, the technique according to the present disclosure has other effects obvious to a person skilled in the art from the description of this specification together with or instead of the above effects.

Additionally, the present technology may also be configured as below.

(1) A display control device including:
a screen control unit configured to generate objects including content, generate a screen in which the objects are consecutively arranged in a transverse direction, and control the screen; and
a user information acquiring unit configured to acquire user information including positional information of a user with respect to the screen,
wherein the screen control unit controls the screen based on the user information acquired by the user information acquiring unit.

(2) The display control device according to (1),
wherein the user information further includes line of sight information of the user.

(3) The display control device according to (2),
wherein the screen control unit determines an object in which the user is interested based on the user information, and when the user causes a target of interest to transition to another object, the screen control unit replaces the object in which the user has been interested before transition with an object including other content.

(4) The display control device according to (2) or (3), wherein the screen control unit determines an object in which the user is interested based on the user information, and sets a bookmark to the object in which the user is interested.

(5) The display control device according to any one of (2) to (4),
wherein the screen control unit determines an object in which the user is interested based on the user information, and controls brightness of the screen based on the object in which the user interested.

(6) The display control device according to any one of (1) to (5),
wherein the screen control unit calculates a moving speed and direction of the user based on the positional information of the user with respect to the screen, and scrolls the object based on the moving speed and direction of the user.

(7) The display control device according to any one of (1) to (6),
wherein the screen control unit controls an information amount of content included in the object based on the positional information of the user with respect to the screen.

(8) The display control device according to any one of (1) to (7),
wherein the screen control unit associates a partial range including a portion of the screen in front of the user based on the positional information of the user with respect to the screen with the user, and controls the partial range and the other ranges distinctively.

(9) The display control device according to (8),
wherein the user information further includes account information of the user, and
the screen control unit associates content included in an object in the partial range with the account information of the user.

(10) The display control device according to (8),
wherein the user information further includes motion information of the user, and
the screen control unit performs control corresponding to the motion information of the user on an object in the partial range.

(11) The display control device according to any one of (1) to (10),
wherein the user information further includes motion information of the user, and
the screen control unit performs control corresponding to the motion information of the user on the screen.

(12) The display control device according to (11),
wherein the control corresponding to the motion information of the user is changed based on the positional information of the user with respect to the screen.

(13) The display control device according to any one of (1) to (12),
wherein the screen control unit determines a mirror image position of the user in the screen based on the positional information of the user with respect to the screen, and generates a screen in which the objects are arranged to avoid the mirror image position of the user.

(14) The display control device according to any one of (1) to (13),
wherein, when an object is added in the screen, the screen control unit controls an addition position of the object based on the positional information of the user with respect to the screen.

(15) The display control device according to any one of (1) to (14),
wherein, when an object is deleted in the screen, the screen control unit controls an object arrangement after the object is deleted based on the positional information of the user with respect to the screen.

(16) A display control method including, by an arithmetic processing device:
generating objects including content and generating a screen in which objects are consecutively arranged in a transverse direction;
acquiring user information including positional information of a user with respect to the screen; and
controlling the generated screen based on the acquired user information.

(17) A program for causing a computer to function as:
a screen control unit configured to generate objects including content, generate a screen in which the objects are consecutively arranged in a transverse direction, and control the screen; and
a user information acquiring unit configured to acquire user information including positional information of a user with respect to the screen,
wherein the screen control unit controls the generated screen based on the user information acquired by the user information acquiring unit.

(18) A display control system including:
a plurality of display units;
a position acquiring unit configured to acquire a positional relation of the plurality of display units; and
a screen control unit configured to generate screens displayed on the plurality of display units as screens that are mutually associated based on the positional relation.

(19) The display control system according to (18),
wherein the screen control unit generates a virtual screen corresponding to a region including the plurality of display units, and generates a screen of the region corresponding to the plurality of display units as the screens displayed by the plurality of display units based on the positional relation in the virtual screen.

(20) The display control system according to (18),
wherein the screen control unit generates the screens displayed by the plurality of display units as consecutive screens based on the positional relation.

(21) The display control system according to (19) or (20),
wherein, when an object is selected in a screen displayed by one display unit of the plurality of display units, the object is moved to a screen displayed by another display unit in a state in which selection of the object is maintained, and the selection of the object is released,
the screen control unit generates a screen in which the object is arranged at a position at which the selection is released in the screen displayed by the other display unit.

(22) The display control system according to any one of (19) to (21),
wherein, when an object is selected in a screen displayed by one display unit of the plurality of display units, and the object is moved in a state in which selection of the object is maintained,
the screen control unit acquires last coordinates of the object in the screen displayed by the one display unit, and
when the selection of the object is released in a region other than the screens displayed by the plurality of display units,
the screen control unit generates a screen in which the object is arranged at the acquired coordinates.

(23) The display control system according to any one of (18) to (22),
wherein the screen control unit calculates a distance between neighboring display units of the plurality of display units based on the positional relation, and generates screens divided by a dividing line of a width based on the distance.

(24) A display control method including:
acquiring a positional relation of a plurality of display units; and
generating, by an arithmetic processing device, screens displayed on the plurality of display units as screens that are mutually associated based on the positional relation, and controlling the generated screens.

(25) A program for causing a computer to function as:
a plurality of display units;
a position acquiring unit configured to acquire a positional relation of the plurality of display units; and
a screen control unit configured to generate screens displayed on the plurality of display units as screens that are mutually associated based on the positional relation.

What is claimed is:

1. A display control device, comprising:
one or more processors configured to:
    generate a plurality of objects that include content;
    generate a screen in which the plurality of objects are arranged;
    control the screen;
    acquire user related information that includes positional information of a user with respect to the screen at any instance;
    determine a first object of the plurality of objects as a target of interest of the user based on the user related information, wherein the first object includes a first content;
    control the screen based on the acquired user related information of the user;
    transition the target of interest of the user from the first object to a second object of the plurality of objects based on a change in the user related information;
    replace the first object with a third object of the plurality of objects that includes a second content different from the first content based on the transition in the target of interest of the user;
    control addition of a fourth object of the plurality of objects in the screen; and
    control an addition position of the fourth object based on the positional information of the user with respect to the screen.

2. The display control device according to claim 1, wherein the user related information further includes line of sight information of the user.

3. The display control device according to claim 1, wherein the one or more processors are further configured to set a bookmark to the first object in which the user is interested.

4. The display control device according to claim 1, wherein the one or more processors are further configured to control brightness of the screen based on the first object in which the user is interested.

5. The display control device according to claim 1, wherein the one or more processors are further configured to:
    calculate a moving speed and a direction of the user based on the positional information of the user with respect to the screen; and
    scroll the first object based on the moving speed and the direction of the user.

6. The display control device according to claim 1, wherein the one or more processors are further configured to control an information amount of the first content included in the first object based on the positional information of the user with respect to the screen.

7. The display control device according to claim 1, wherein the one or more processors are further configured to:
    associate a first partial range that includes a portion of the screen in front of the user based on the positional information of the user with respect to the screen; and
    control the first partial range and a plurality of second partial ranges,
        wherein each of the plurality of second partial ranges is different from the first partial range.

8. The display control device according to claim 7, wherein the user related information further includes account information of the user, and
the one or more processors are further configured to associate third content included in a fifth object of the plurality of objects in the first partial range with the account information of the user.

9. The display control device according to claim 7, wherein the user related information further includes motion information of the user, and
the one or more processors are further configured to control a fifth object of the plurality of objects in the first partial range based on the motion information of the user.

10. The display control device according to claim 1, wherein the user related information further includes motion information of the user, and
the one or more processors are further configured to control the screen based on the motion information of the user.

11. The display control device according to claim 10, wherein the motion information of the user is changed based on the positional information of the user with respect to the screen.

12. The display control device according to claim 1, wherein the one or more processors are further configured to:
    determine a mirror image position of the user in the screen based on the positional information of the user with respect to the screen; and
    generate a different screen in which the plurality of objects are arranged to avoid the mirror image position of the user.

13. The display control device according to claim 1, wherein the one or more processors are further configured to:
    delete a sixth object of the plurality of objects in the screen; and
    control an object arrangement after the sixth object is deleted based on the positional information of the user with respect to the screen.

14. A display control method, comprising:
in an arithmetic processing device:
    generating a plurality of objects including content;
    generating a screen in which the plurality of objects are arranged;
    acquiring user related information including positional information of a user with respect to the screen at any instance;
    determining a first object of the plurality of objects as a target of interest of the user based on the user related information, wherein the first object includes a first content;
    controlling the generated screen based on the acquired user related information of the user;

transitioning the target of interest of the user from the first object to a second object of the plurality of objects based on a change in the user related information;

replacing the first object with a third object of the plurality of objects that includes a second content different from the first content based on the transition in the target of interest of the user;

controlling addition of a fourth object of the plurality of objects in the screen; and controlling an addition position of the fourth object based on the positional information of the user with respect to the screen.

15. A non-transitory computer-readable medium having stored thereon computer-executable instructions for causing a computer to execute operations, the operations comprising:

generating a plurality of objects including content;

generating a screen in which the plurality of objects are arranged;

controlling the screen;

acquiring user related information including positional information of a user with respect to the screen at any instance;

determining a first object of the plurality of objects as a target of interest of the user based on the user related information, wherein the first object includes a first content;

controlling the generated screen based on the acquired user related information of the user;

transitioning the target of interest of the user from the first object to a second object of the plurality of objects based on a change in the user related information;

replacing the first object with a third object of the plurality of objects that includes a second content different from the first content based on the transition in the target of interest of the user;

controlling addition of a fourth object of the plurality of objects in the screen; and controlling an addition position of the fourth object based on the positional information of the user with respect to the screen.

16. A display control system, comprising:

a plurality of display units; and one or more processors configured to:

acquire a positional relation of the plurality of display units;

generate a virtual screen that includes screens displayed on the plurality of display units and non-displayed regions, wherein the non-displayed regions are between neighboring display units of the plurality of display units, wherein the screens displayed on the plurality of display units are mutually associated in the virtual screen based on the positional relation of the plurality of display units;

determine a distance between the neighboring display units of the plurality of display units based on the positional relation of the neighboring display units; and generate the screens divided by a line of a width based on the distance between the neighboring display units.

17. The display control system according to claim 16, wherein the one or more processors are further configured to:

generate the virtual screen that corresponds to a region that includes the plurality of display units; and generate the virtual screen of the region that corresponds to the plurality of display units as the screens displayed by the plurality of display units based on the positional relation in the virtual screen.

18. The display control system according to claim 16, wherein the one or more processors are further configured to generate the screens displayed by the plurality of display units as consecutive screens based on the positional relation.

19. The display control system according to claim 17, wherein, based on an object that is selected in a first screen displayed by a first display unit of the plurality of display units, the object is moved to a second screen displayed by a second display unit in a state in which selection of the object is maintained, and the selection of the object is released, and the one or more processors are further configured to generate a third screen in which the object is arranged at a position at which the selection is released in the second screen displayed by the second display unit.

20. The display control system according to claim 17, wherein, based on an object that is selected in a first screen displayed by one display unit of the plurality of display units, and the object is moved in a state in which selection of the object is maintained, the one or more processors are further configured to:

acquire last coordinates of the object in the first screen displayed by the one display unit, and generate a second screen in which the object is arranged at the acquired last coordinates, based on the selection of the object that is released in a region other than the screens displayed by the plurality of display units.

21. A display control method, comprising:

acquiring a positional relation of a plurality of display units;

generating, by an arithmetic processing device, a virtual screen including screens displayed on the plurality of display units and non-displayed regions, wherein the non-displayed regions are between neighboring display units of the plurality of display units, wherein the screens displayed on the plurality of display units that are mutually associated in the virtual screen, based on the positional relation of the plurality of display units;

determining a distance between the neighboring display units of the plurality of display units based on the positional relation of the neighboring display units;

generating the screens divided by a line of a width based on the distance between the neighboring display units; and controlling the generated screens of the plurality of display units.

22. A non-transitory computer-readable medium having stored thereon computer-executable instructions for causing a computer to execute operations, the operations comprising:

acquiring a positional relation of a plurality of display units;

generating a virtual screen including screens displayed on the plurality of display units and non-displayed regions, wherein the non-displayed regions are between neighboring display units of the plurality of display units, wherein the screens displayed on the plurality of display units are mutually associated in the virtual screen, based on the positional relation of the plurality of display units;

determine a distance between the neighboring display units of the plurality of display units based on the positional relation of the neighboring display units; and generate the screens divided by a line of a width based on the distance between the neighboring display units.

23. The display control device according to claim 1, wherein the one or more processors are further configured to generate the screen in which the plurality of objects are consecutively arranged in a transverse direction on the screen.

24. The display control device according to claim 1, wherein the third object is different from the first object and the second object.

\* \* \* \* \*